United States Patent
Chae et al.

(10) Patent No.: US 12,473,687 B2
(45) Date of Patent: Nov. 18, 2025

(54) CLOTHES FOLDING MACHINE

(71) Applicant: LG Electronics Inc., Seoul (KR)

(72) Inventors: Aekyung Chae, Seoul (KR); Keunjoo Kim, Seoul (KR); Chanwoo Moon, Seoul (KR); Choongho Lim, Seoul (KR)

(73) Assignee: LG Electronics Inc.

( * ) Notice: Subject to any disclaimer, the term of this patent is extended or adjusted under 35 U.S.C. 154(b) by 663 days.

(21) Appl. No.: 17/624,697

(22) PCT Filed: Mar. 23, 2020

(86) PCT No.: PCT/KR2020/003967
§ 371 (c)(1),
(2) Date: Jan. 4, 2022

(87) PCT Pub. No.: WO2021/002567
PCT Pub. Date: Jan. 7, 2021

(65) Prior Publication Data
US 2022/0251775 A1    Aug. 11, 2022

(30) Foreign Application Priority Data
Jul. 4, 2019    (KR) .................... 10-2019-0080910

(51) Int. Cl.
*D06F 89/02* (2006.01)
(52) U.S. Cl.
CPC ................. *D06F 89/023* (2013.01)

(58) Field of Classification Search
CPC ................. D06F 89/00; D06F 89/023
USPC .............................................. 223/37
See application file for complete search history.

(56) References Cited

U.S. PATENT DOCUMENTS

| | | | | |
|---|---|---|---|---|
| 4,093,205 A | * | 6/1978 | Kober | B65H 45/04 493/425 |
| 6,241,232 B1 | * | 6/2001 | Schmitt | B65B 63/04 493/413 |
| 2019/0292718 A1 | * | 9/2019 | Maeshima | D06F 89/00 |
| 2020/0248397 A1 | * | 8/2020 | Nitschmann | B65H 29/16 |
| 2020/0385918 A1 | * | 12/2020 | Naor | D06F 89/00 |

FOREIGN PATENT DOCUMENTS

| | | |
|---|---|---|
| CN | 105544173 | 5/2016 |
| EP | 2891744 | 7/2015 |
| KR | 20170095620 | 8/2017 |
| KR | 101874502 | 7/2018 |
| WO | WO2019038752 | 2/2019 |

* cited by examiner

Primary Examiner — Nathan E Durham
(74) Attorney, Agent, or Firm — Fish & Richardson P.C.

(57) ABSTRACT

Proposed is a clothes folding machine, which includes a case, a loading unit disposed at an upper portion of the case and conveying a clothes item gripped by grippers into the case, a folding unit including a longitudinal-line folder folding both sleeves of the clothes item conveyed by the loading unit in a width direction and a transverse-line folder longitudinally folding the clothes item several times, and an unloading unit disposed at a lower portion of the case and conveying the clothes item folded by the folding unit outside the case.

19 Claims, 31 Drawing Sheets

[FIG. 10]
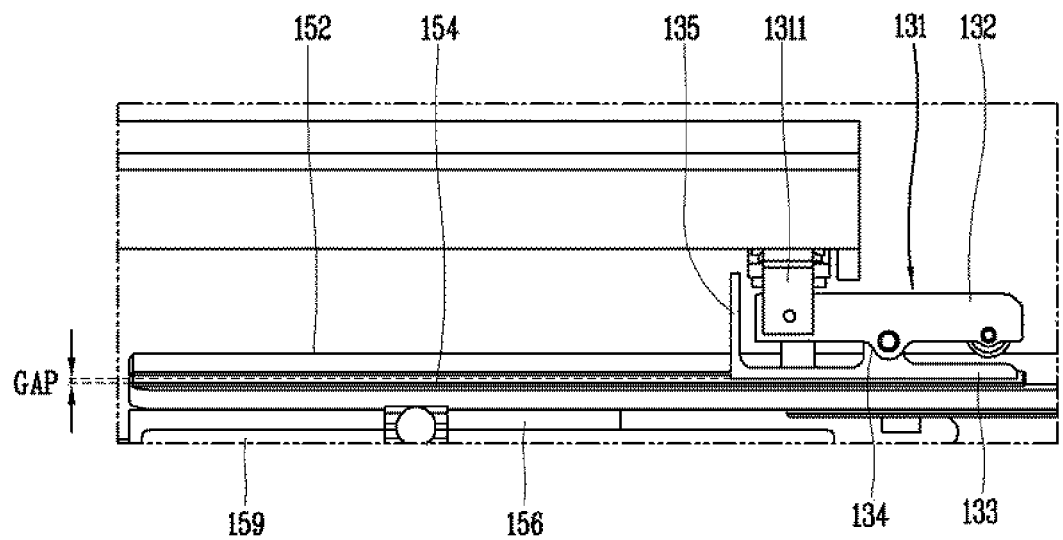
FIG. 11
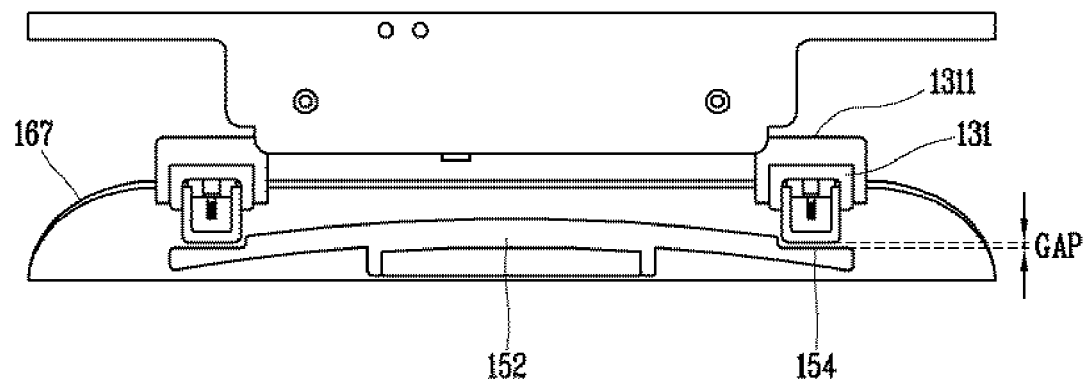

FIG. 26
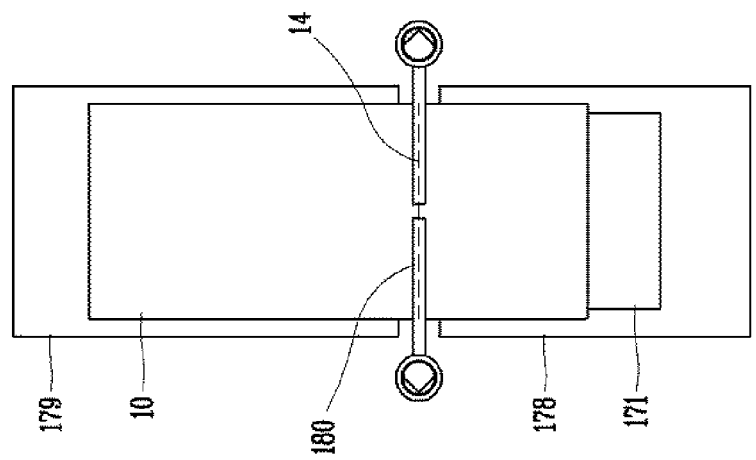
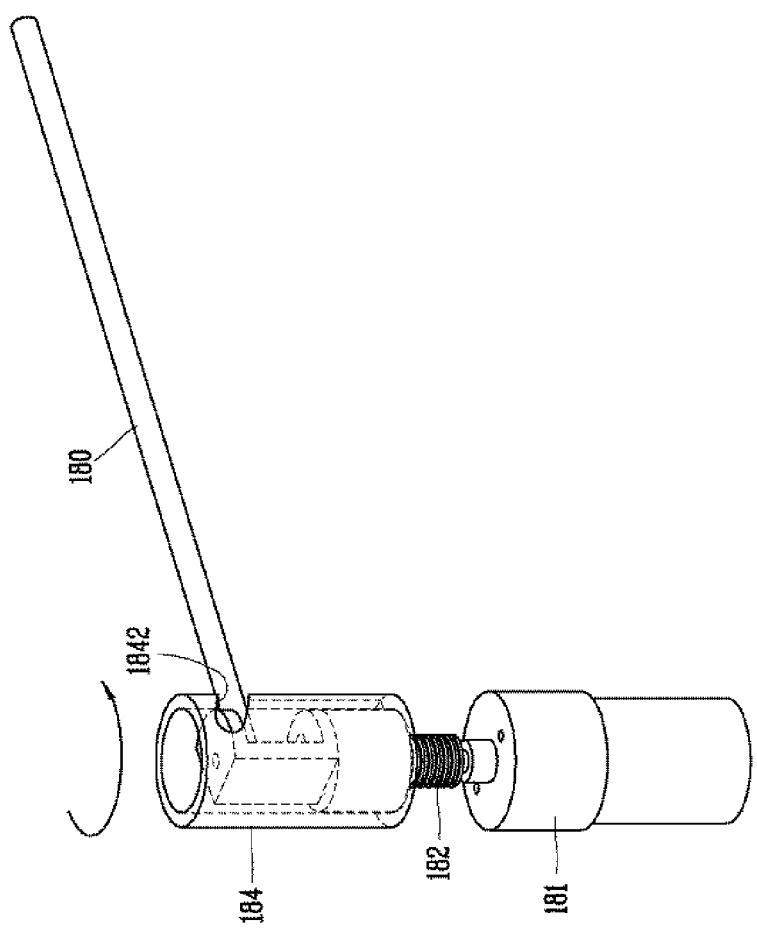

FIG. 35
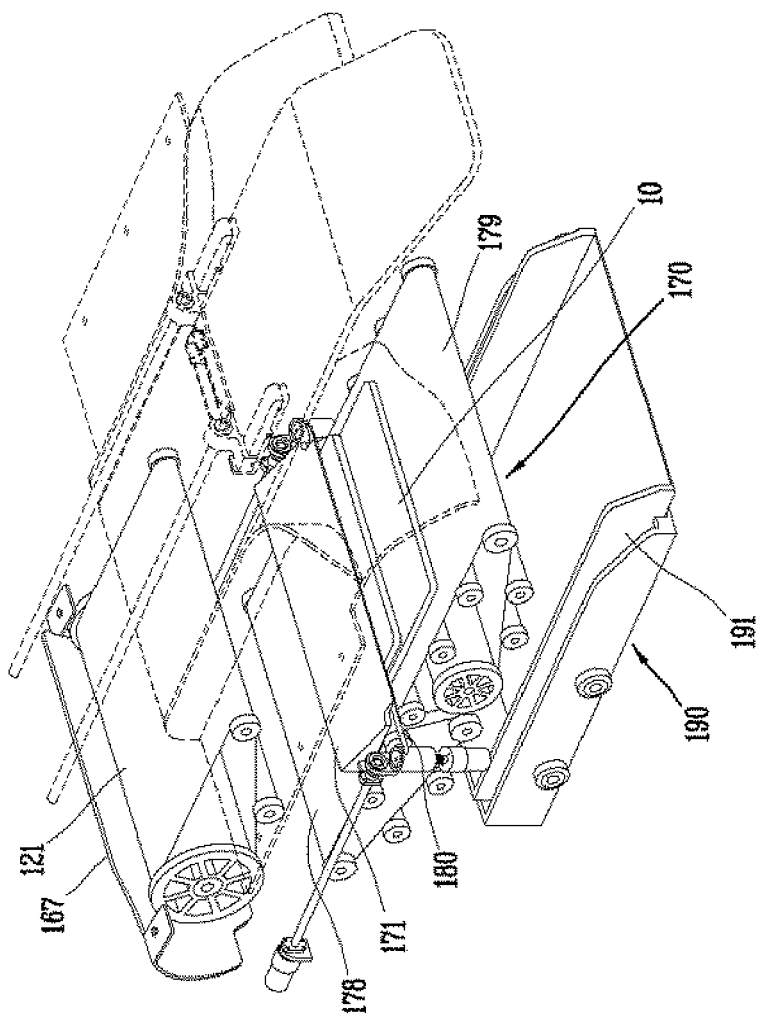
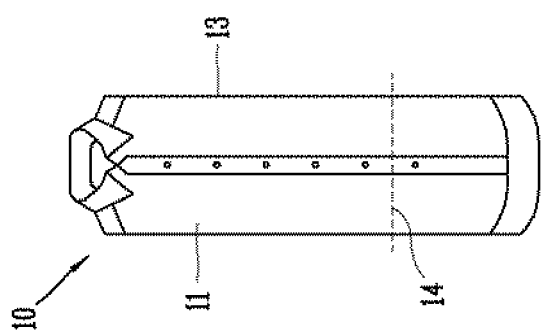

CLOTHES FOLDING MACHINE

CROSS-REFERENCE TO RELATED APPLICATIONS

This application is a National Stage application under 35 U.S.C. § 371 of International Application No. PCT/KR2020/003967, filed on Mar. 23, 2020, which claims the benefit of Korean Application No. 10-2019-0080910, filed on Jul. 4, 2019. The disclosures of the prior applications are incorporated by reference in their entirety.

TECHNICAL FIELD

The present disclosure relates to a clothes folding machine that transversely and longitudinally folds clothes.

BACKGROUND ART

In general, a clothes folding machine is a machine that automatically folds clothes that have been washed and dried.

A clothes folding machine may be divided into a loading unit, a folding unit, and an unloading unit.

When a user hangs a clothes item on the loading unit, the loading unit holds and conveys the clothes item to the folding unit.

The folding unit performs longitudinal-line folding that longitudinally folds clothes, transverse-line folding that transversely folds clothes, etc.

The unloading unit discharges the clothes item finished with folding out of the clothes folding machine.

Clothes discharged through the unfolding unit may be neatly stacked in predetermined shapes on a shelf and exposed to customers in a clothes store, etc., or may be stored in a drawer, etc. by customers at home, etc.

Clothes folding machines of the related art may be classified into a conveyer type, a bar type, a plate type, etc., depending on the folding method and conveying method.

A conveyer-type clothes folding machine moves clothes in the space between conveyers and folds the clothes therein.

A plate-type clothes folding machine folds clothes using two side plates having a height difference from a middle plate.

A bar-type clothes folding machine supports a clothes item with one bar and folds the clothes item with a moving bar.

The conveyer-type, bar-type, and plate-type clothes folding machines are each divided into and composed of a loading unit, a folding unit, and an unloading unit.

However, according to clothes folding machines of the related art, loading, folding, and unloading are separately performed at different stages, and particularly, longitudinal-line folding and transverse-line folding should be performed at least two times or more on different stages when clothes are folded, so there is a problem that the sizes of the folding machines are large.

A clothes folding machine that performs transverse-line folding using the rotation direction of conveyers has been disclosed in a prior patent document WO 2018/122841 A1 (Pub. Date: Jul. 5, 2018) that is closest to the subject of the present disclosure.

However, the clothes folding machine of the prior patent document includes a total of seven stacked conveyers, so it is limited to perform loading or unloading or reduce the size of the folding machine.

The problems of the prior patent document are described in more detail hereafter.

FIG. 1 is a conceptual view illustrating a transverse-line folding unit disclosed in a prior patent document.

A transverse-line folding unit 7 is configured to perform primary transverse-line folding in the longitudinal direction of clothes by conveying clothes into the space between two conveyers 1 and 2, which are longitudinally spaced apart from each other on a fourth conveyer layer 3, in opposite directions.

Further, the transverse-line folding unit 7 is configured to perform secondary transverse-line folding in the longitudinal direction of clothes by conveying clothes into the space between two conveyers 5 and 6, which are longitudinally spaced apart from each other on a sixth conveyer layer 4, in opposite directions.

However, the transverse-line folding is composed of primary transverse-line folding and secondary transverse-line folding that are performed on different layers, that is, the fourth conveyer layer 3 and the sixth conveyer layer 4, respectively, the number of conveyer layers increases over 2, so there is a problem that the size of the folding machine is increased.

Further, even though folding is performed a plurality of times on the same layer in the same way (one way selected from a conveyer type, a bar type, and a plate type), there is a problem that the size of clothes folding machines of the related art is increased.

Further, according to the clothes folding machines of the related art, since primary transverse-line folding and secondary transverse-line folding are performed at different layers, the time of the entire process that is used to fold a clothes item is increased, so there is a problem that clothes are disheveled because the clothes are moved a longer distance for folding.

DISCLOSURE

Technical Problem

The present disclosure has been made in an effort to solve a problem of the related art (that one layer and one-time folding increase the size of a folding machine) and an objective of the present disclosure is to provide a clothes folding machine that can greatly contribute to downsizing of a product because transverse-line folding is performed a plurality of times on a single stage.

The present disclosure has been made in an effort to solve a problem of the related art (that when one layer and several-time folding are applied, the size of a folding machine is increased) and an objective of the present disclosure is to provide a clothes folding machine in which a primary transverse-line folder, which performs primary transverse-line folding, and a secondary transverse-line folder, which performs secondary transverse-line folding, are compactly disposed at the front and rear and can complete folding in a limited single stage space.

A third objective of the present disclosure is to provide a clothes folding machine in which the sliding direction of a primary transverse-line folder (push board) and a push direction of a secondary transverse-line folder (conveyer) cross each other, so primary and secondary transverse-line folding can be performed within the minimum movement distance of clothes.

A fourth objective of the present disclosure is to provide a clothes folding machine of which the number of parts and costs can be reduced because a primary transverse-line folder and a secondary transverse-line folder share one guide bar and the guide bar forms a folding line in each of primary and secondary transverse-line folding.

A fifth objective of the present disclosure is to provide a clothes folding machine of which the structure can be simplified by performing in a plurality of same folding type when folding is performed a plurality of times on the same layer.

Technical Solution

In order to achieve the first objective, in a clothes folding machine according to the present disclosure, a primary transverse-line folder that folds clothes along a primary transverse line and a secondary transverse-line folder that folds clothes along a secondary transverse lien are disposed at the single stage and transverse-line folding of clothes is completed at the stage, so it is possible to efficiently use a space and minimize the size of a product.

In order the achieve the second objective, in a clothes folding machine according to the present disclosure, a primary transverse-line folder is disposed at a start point of movement of clothes at a single stage and a secondary transverse-line folder (guide bar) is compactly disposed in a space between conveyers, whereby several-time transverse-line folding can be completed in a limited single stage space.

In order to achieve the third objective, in a clothes folding machine according to the present disclosure, a primary transverse-line folder is installed to be able to slide in a front-rear direction of a case and a secondary transverse-line folder (guide bar) puts a clothes item into a space between two conveyers, which area adjacent to each other in the front-rear direction of the case, in an up-down direction or an inclination direction crossing the sliding direction of the primary transverse-line folder, whereby primary and secondary transverse-line folding is performed within a minimum movement distance, so the folding time can be minimized.

In order to achieve the fourth objective, in a clothes folding machine according to the present disclosure, one transverse-line guide bar is disposed to be able to rotate across the sliding direction of a primary transverse-line folder or to be movable in an up-down direction, and the primary transverse-line folder and the secondary transverse-line folder form primary and secondary transverse folding lines while sharing the one transverse-line guide bar, whereby it is possible to reduce the number of parts and costs.

In order to achieve the fifth objective, in a clothes folding machine according to the present disclosure, three conveyers are spaced apart from each other in a series in a front-rear direction of a case, and guide bars is disposed to be movable up and down between two conveyers adjacent to each other in a front-rear direction, whereby a folding structure can be simplified.

A clothes folding machine according to an embodiment of the present disclosure includes: a case; a loading unit disposed at an upper portion of the case and conveying a clothes item gripped by grippers into the case; a folding unit including a longitudinal-line folder folding both sleeves of the clothes item conveyed by the loading unit along longitudinal lines and a transverse-line folder folding the clothes item along transverse lines several times; and an unloading unit disposed at a lower portion of the case and conveying the clothes item folded by the folding unit outside the case.

The transverse-line folder may be disposed at a single stage at a downstream side of a path of the clothes item.

The transverse-line folder may include: a push board installed to be able to slide in a front-rear direction of the case, and folding the clothes item along a primary transverse line formed at a first longitudinal portion of the clothes item by pushing the clothes item forward over the primary transverse line; and a plurality of conveyers spaced apart from each other with a predetermined gap therebetween in the front-rear direction under the push board, and folding the clothes item along a second transverse line formed at a second longitudinal portion of the clothes item by pushing the clothes item into the gap.

According to this configuration, the first and second objectives can be accomplished.

In particular, the clothes folding machine may further include a guide bar elongated in a transverse direction of the clothes item ahead of the push board, installed to be movable in a direction crossing the sliding direction over the gap, and pressing the primary transverse line or the secondary transverse line.

According to this configuration, the third objective can be accomplished. Further, folding along the primary and secondary transverse lines can be easily achieved by the guide bar.

According to an example related to the present disclosure, the push board and the conveyers share the guide bar, whereby the fourth objective can be accomplished.

In particular, the push board may fold the clothes item along the primary transverse line by moving forward with respect to the conveyers and pushing the rear end of the clothes item forward with the guide bar moving down from over the gap and pressing down the primary transverse line of the clothes item, the push board may be moved rearward with the guide bar moved up over the gap, and the conveyers may be rotated in opposite direction to put the clothes item into the gap with the guide bar further moving down in the gap and pressing down the secondary transverse line of the clothes item, whereby the clothes item may be folded along the secondary transverse line.

According to an example related to the present disclosure, the conveyers may include: a first conveyer disposed to face a front at the start point at the downstream side; and a second conveyer disposed ahead the first conveyer with the gap therebetween, in which a front end of the first conveyer and a rear end of the second conveyer may be inclined downward forward and maintain a predetermined gap therebetween.

According to an embodiment for driving the push board, the clothes folding machine may include: a motor driving the push board; a connecting portion laterally protruding from a side of the push board; a plurality of pulleys connected with the motor through a shaft and spaced apart from each other in the sliding direction; and a belt connecting the pulleys, connected with the connection portion at a side, and transmitting power of the motor to the push board.

According to another embodiment for driving the push board, the clothes folding machine may include: a motor driving the push board; a connecting portion laterally protruding from a side of the push board; a ball screw connected with the motor to rotate; and a front-rear moving member fastened to the connecting portion, thread-fastened to the ball screw, and mounted to be movable in a front-rear direction when the ball screw is rotated.

According to an example related to the present disclosure, the push board may have a triangular cross-section and may be elongated in a lateral direction of the case. The push board may have a right-triangular cross-section.

According to this configuration, the following advantages are achieved by the cross-sectional shape of the push board.

First, before the push board is moved over the cap from a start point of movement of clothes, the push board is disposed to be movable toward the front with a clothes item at least partially overlapping a slope of the right triangle that is the top surface of the push board, so the front-rear movement distance of the push board at a single stage becomes short, whereby the size (particularly, the front-rear length) of the clothes folding machine can be reduced.

Second, even if a portion of a clothes item does not overlap the top surface of the push board because the clothes item is short, the point end of the push board can easily push the rear end of the clothes item.

In particular, the guide bar may be installed over the tap to be movable in an up-down direction or an incline direction along the gap.

According to an example related to the present disclosure, the guide bar may be disposed at each of both sides in a transverse direction of the case, the guide bars each may be horizontally rotated about a rotary shaft vertically disposed, and the guide bars may be disposed in parallel with each other toward a front of the case in which the clothes item is put in or may be disposed to face each other in the transverse direction.

According to an example related to the present disclosure, the clothes folding machine may include: a motor driving the guide bar; a screw connected with the motor; a slider from which the guide bar protrudes in one direction and that is thread-fastened to the screw to slide in an up-down direction; and a housing accommodating the slider such that the slider can slide and having a guide hole through which the guide bar protrudes from the slider and that guides up-down movement of the guide bar.

According to an example related to the present disclosure, the housing may further include a rotation guide hole circumferentially formed at an upper end of the guide hole and guiding rotation of the guide bar.

According to another aspect of the present disclosure, a clothes folding machine includes a push board disposed in a case and installed to be able to slide in a front-rear direction of the case at a start point of movement of a clothes item at a downstream side of a path of the clothes item, a plurality of conveyers spaced apart from each other with a predetermined gap therebetween in the front-rear direction under the push board, and a guide bar installed over the gap and being movable up and down in the gap. Further, the clothes folding machine may fold clothes in the following method of folding clothes.

The method of folding clothes includes: a step in which the conveyers convey the clothes item toward a front of the case such that a primary transverse line of the clothes item for folding a first portion of the clothes item along a transverse line is positioned over the gap; a step in which the guide bar moves down from over the gap and presses the clothes item; a step in which the push board folds the clothe item along the primary transverse line to overlap by moving toward the front from the start point and pushing an turning over the first portion of the clothes item ahead of the primary transverse line; a step in which the push board is returned to the start point; a step in which the guide bar is moved over the gap; a step in which the conveyers convey a clothes item toward a front of the case such that a secondary transverse line of the clothes item for folding a second portion of the clothes item along a transverse line is positioned over the gap; a step in which the guide bar moves into the gap and presses the secondary transverse line; and a step in which the conveyers folds the second portion of the clothes item along the secondary transverse line to overlap by putting the secondary transverse line into the gap.

According to an example related to the method of folding clothes, the push board, the guide bar, and the conveyers may be disposed at a single stage at the downstream side.

According to an example related to the method of folding clothes, the push board may have a triangular cross-section, and the method may include a step in which before the push board is moved to the front, the clothes item overlaps at least a portion of a top surface of the push board in an up-down direction and is conveyed toward the front from the start point in the overlapping state.

According to an example related to the method of folding clothes, the method may further include a step in which the clothes item is folded along longitudinal lines of the clothes item for simultaneously folding both sleeves of the clothes item to overlap at an upstream side of the path of the clothes item simultaneously with loading of the clothes before being folded along the primary transverse line.

According to an example related to the method of folding clothes, the method may further include a step of unloading the clothes item to the front of the case after the clothes item is folded along the secondary transverse line.

According to the clothes folding machine related to the present disclosure, transverse-line folding may be performed several times at a single stage regardless of the folding type.

The clothes folding machine includes: a case; a loading unit having a plurality of grippers, disposed at an upper portion of the case, and conveying clothes gripped by the grippers into the case; a folding unit including a longitudinal-line folder that folds both sleeves of the clothes item conveyed by the loading unit along longitudinal lines and a transverse-line folder that folds the clothes item along transverse lines several times; and an unloading unit disposed at a lower portion of the case and conveying the clothes item folded by the folding unit out of the case, in which the transverse-line folder includes: a primary transverse-line folder folding the clothes item along a primary transverse line for folding a first portion of the clothes item to overlap; and a secondary transverse-line folder folding the clothes item along a secondary transverse line for folding a second portion of the clothes item to overlap, in which the primary transverse-line folder and the secondary transverse-line folder are disposed at a single stage at a downstream side of a path of the clothes item.

According to the clothes folding machine in which transverse-line folding is performed several times at a single stage regardless of a folding type, the loading unit and the longitudinal-line folder may be disposed at a single stage at an upstream side of the path of the clothes item, and the loading unit and the longitudinal-line folder may be disposed at a different stage from the transverse-line folder in an up-down direction of the case.

According to the clothes folding machine related to the present disclosure, transverse-line folding may be performed several times at a single stage in the same folding type.

The clothes folding machine includes: a case; a loading unit having a plurality of grippers, disposed at an upper portion of the case, and conveying clothes gripped by the grippers into the case; a folding unit including a longitudinal-line folder that folds both sleeves of the clothes item conveyed by the loading unit along longitudinal lines and a transverse-line folder that folds the clothes item along transverse lines several times; and an unloading unit disposed at a lower portion of the case and conveying the clothes item folded by the folding unit out of the case, in which the transverse-line folder includes: a plurality of conveyers that is disposed at a single stage at a downstream side in a path of the clothes item, is disposed as three or more components in a series with predetermined gaps therebetween in a front-rear direction of the case, folds the clothes item along a primary transverse lie formed at a first longitudinal portion of the clothes item by putting the clothes item into a first gap spaced toward a front of the case from a start point of movement of the clothes item of the gaps, and folds the clothes item along a secondary transverse line formed at a second lateral portion of the clothes item by putting the clothes into a second gap spaced toward the front from the first gap; and a plurality of guide bars installed to be movable up and down over the first gap and the second gap, respectively, and pressing the primary transverse line and the secondary transverse line, respectively.

According to this configuration, the structure of the folding machine can be simplified.

According to the clothes folding machine of which the structure can be simplified, the conveyers may be rotated in same direction when conveying the clothes in a front-rear direction, and may be rotated in opposite directions when folding the clothes item along the primary transverse line and the secondary transverse line, thereby being able to put the clothes item into the gap.

According to the clothes folding machine of which the structure can be simplified, the conveyers may include: a first conveyer disposed toward the front from the start point at the downstream side; a second conveyer disposed ahead the first conveyer with the first gap therebetween; and a third conveyer disposed ahead the second conveyer with the second gap therebetween, and the guide bars may include: a first guide bar installed over the first gap to be movable up and down and forming the primary transverse line; and a second guide bar installed over the second gap to be movable up and down and forming the secondary transverse line.

According to the clothes folding machine of which the structure can be simplified, a front end portion of the first conveyer and a rear end portion of the second conveyer may be inclined downward rearward and may fold the clothes item along the primary transverse line by putting the clothes item into the first gap, and the clothes item finished with folding along the primary transverse line may be discharged onto the second conveyer from the first gap; and a front end portion of the second conveyer and a rear end portion of the third conveyer may be inclined downward forward and may fold the clothes item along the secondary transverse line by putting the clothes item into the second gap, and the clothes item finished with folding along the secondary transverse line may be discharged under the third conveyer from the first gap.

Advantageous Effects

Effects of the clothes folding machine according to the present disclosure are as follows.

First, a transverse-line folder includes a push board and a plurality of conveyers disposed in series in a front-rear direction, the push board pushes and turns the longitudinal end of a top over a primary transverse line to be formed at a first longitudinal portion of the top by sliding in the front-rear direction over the conveyers, thereby being able to fold the top along the primary transverse line to overlap. Further, the conveyers put a secondary transverse line formed at a second longitudinal portion of the top into a gap formed therebetween, whereby the top can be folded along the secondary transverse line to overlap.

Accordingly, unlike the related art in which the height of folding machines is increased due to folding along transverse lines that is performed at different stages, the clothes folding machine of the present disclosure completes folding along transverse lines at one stage, whereby the height of the clothes folding machine can be considerably decreased, which can greatly contribute to downsizing of a product.

Second, the push board has a right-triangular cross-section, so it can easily push up the lower end of a top horizontally placed on the conveyers.

Third, a guide bar is installed to be movable across the sliding direction of the push board and presses a primary transverse line or a secondary transverse line of a clothe item, whereby it is possible to easily fold the clothes item along the primary transverse line and the secondary transverse line and it is possible to minimize the path for folding the clothes item along transverse lines.

Fourth, when the push board folds a clothes item along a primary transverse line and the conveyers fold the clothes item along the secondary transverse line, the push board and the conveyers press the primary transverse line and the secondary transverse line using one guide bar, so the number of the guide bar for pressing the primary transverse line and the secondary transverse line is decreased from 2 to 1, whereby it is possible to reduce the number of parts and the manufacturing cost.

Fifth, as another embodiment of the transverse-line folder, one conveyer and one guide bar are disposed in a series behind two conveyers instead of the push board, so primary transverse-line folding and secondary transverse-line folding are completed at a single layer, whereby the folding structure can be simplified.

DESCRIPTION OF DRAWINGS

FIG. 10 is an enlarged view of the portion indicated by X in FIG. 9;

FIG. 11 is a cross-sectional view taken along line XI-XI of FIG. 9;

FIGS. 18 to 25 are conceptual views illustrating an operation principle of a transverse-line folder, in which;

FIG. 18 is a conceptual view showing the state in which a portion of a clothes item overlaps at least a portion of a slope of a push board;

FIG. 19 is a conceptual view showing the state in which a clothes item is conveyed with a portion overlapping at least a portion of the push board;

FIG. 20 is a conceptual view showing primary transverse-line folding of a clothes item;

FIG. 21 is a conceptual view showing the state in which a push board is returned to the initial position and a clothes item finished with primary transverse-line folding has been moved back for secondary transverse-line folding;

FIG. 22 is a conceptual view showing the state in which a guide bar presses a secondary transverse line of the moved-back clothes item;

FIG. 23 is a conceptual view showing the state in which a plurality of conveyers puts the clothes item into a gap with the secondary transverse line pressed, and secondary transverse-line folding is performed;

FIG. 24 is an operation state view showing transverse-line folding of a clothes item when the transverse-line folder is seen from above;

FIG. 25 is a conceptual view showing the state in which a guide bar is disposed to face the front in FIG. 24;

FIG. 26 is a conceptual view showing the state in which a guide bar is disposed to face a side in FIG. 24;

FIG. 35 is a conceptual view showing primary transverse-line folding of a clothes item.

BEST MODE

Figure 1:
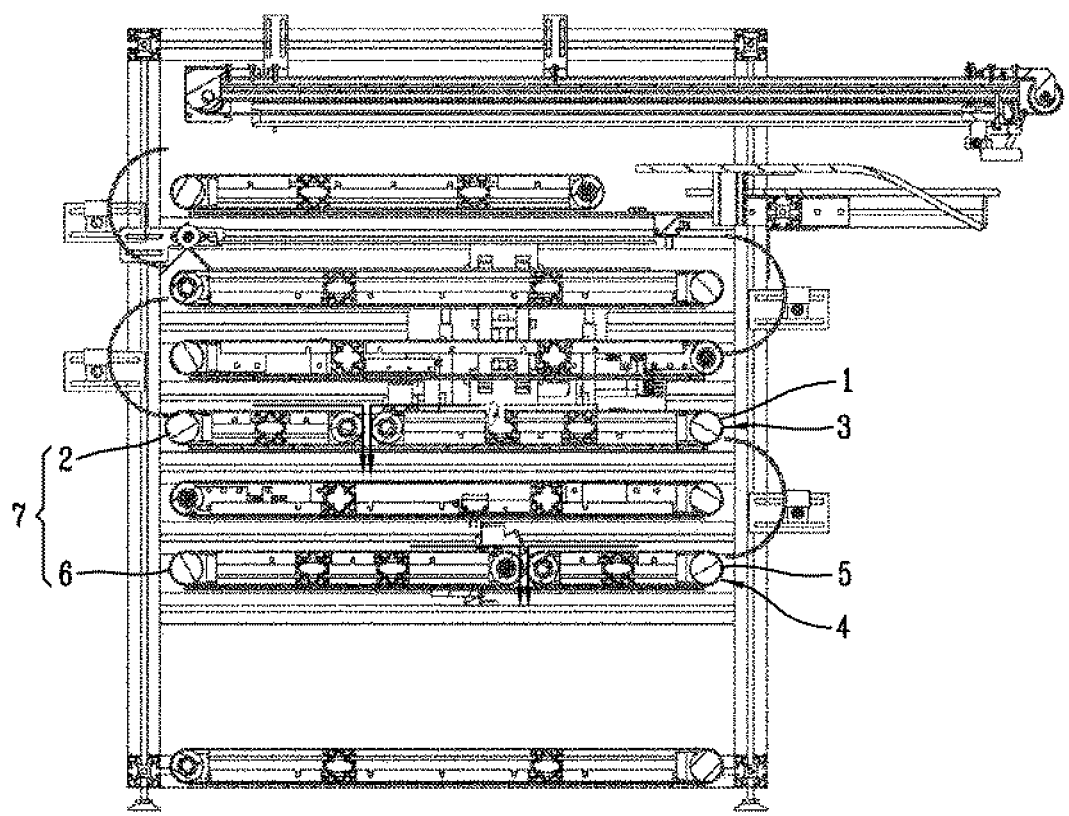
FIG. 1 is a conceptual view illustrating a transverse-line folding unit disclosed in a prior patent document.

Hereafter, embodiments of the present disclosure will be described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present disclosure.

Terms including ordinal numbers such as 'first', 'second', etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Figure 2:
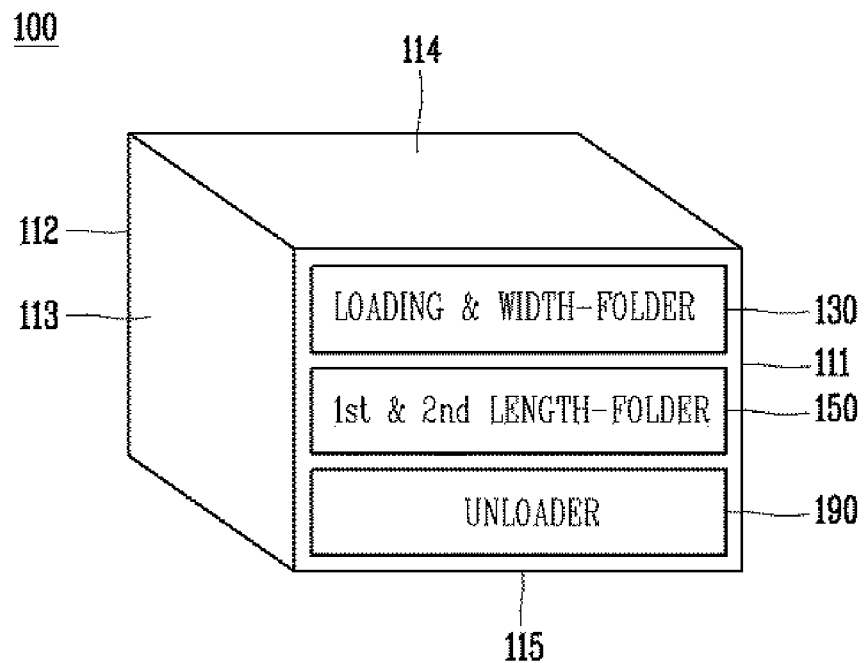
FIG. 2 is a conceptual view showing the external appearance of a clothes folding machine according to the present disclosure.

FIG. 2 is a conceptual view showing the external appearance of a clothes folding machine 100 according to the present disclosure.

The clothes folding machine 100 is configured to automatically fold washed and dried clothes. The clothes include a top 10 and a bottom.

The top 10 that is an object to be folded by the clothes folding machine 100 is complicated to be folded in comparison to a bottom, the top 10 is mainly exemplified in the following description. However, the clothes folding machine 100 can fold both of a top 10 and a bottom.

Figure 5:
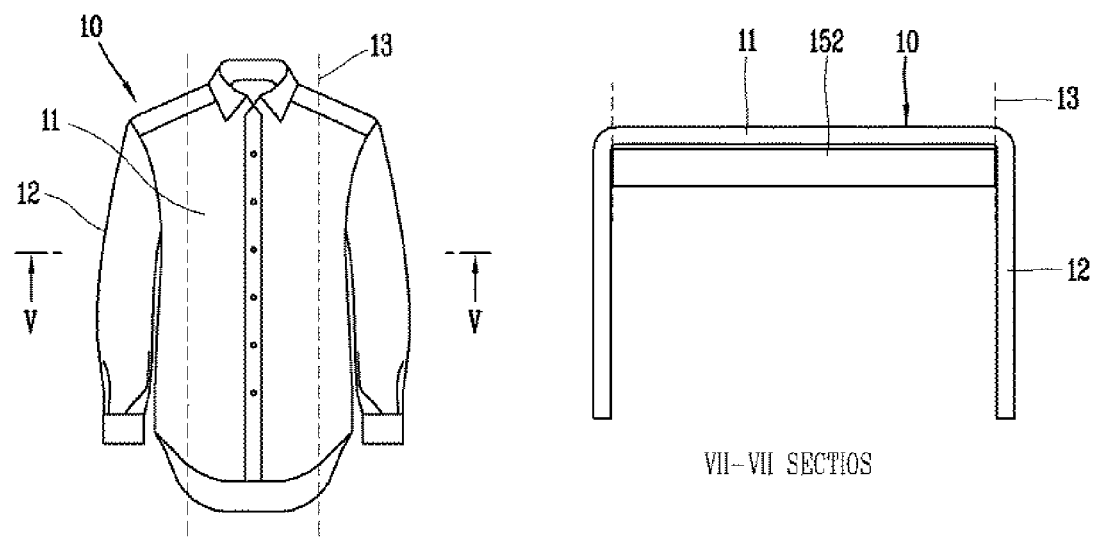
FIG. 5 is a conceptual view showing the state in which sleeves of a top hang down from the main board of FIG. 4.

As shown in FIG. 5, the top 10 has a body part 11 and two sleeves 12 (arm parts). The body part 11 has a neck part and shoulder parts at the upper portion.

The top 10 may be folded by longitudinal-line folding that folds both sleeves 12 along longitudinal-lines 13 to overlap and transverse-line folding that folds the body part 11 several times along transverse lines 14 and 15 (see FIGS. 35 and 36) to overlap.

The longitudinal-lines 13 are straight lines longitudinally extending from left and right shoulder lines with the neck part therebetween.

The transverse lines 14 and 15 are straight lines transversely extending across both sides of the body part 11. A primary transverse line 14 is a folding line that crosses a longitudinal portion of the body part 11 in the width direction and a secondary transverse line 15 is a folding line that crosses another longitudinal portion (close to the neck part) in the width direction.

The clothes folding machine 100 of the present disclosure includes a case 110. The case 110 forms the external shape. The case 110 may be a rectangular parallelepiped. The case 110 has a front surface, a rear surface, two sides, a top surface, and a bottom surface inside which clothes are loaded.

The case 110 includes a front panel 111 forming the front surface, a rear panel 112 forming the rear surface, side panels 113 forming the sides, a top panel 114 forming the top surface, and a bottom panel 115 forming the bottom surface. The case 110 has an accommodation space therein to be able to accommodate several components.

An opening may be formed at the upper portion and the lower portion of the front panel 111. The upper opening is open as a passage for loading clothes and the lower opening is open as a passage for discharged folded clothes to the outside.

The clothes folding machine 100 includes a loading unit 130, a folding unit 150, and an unloading unit 190.

The loading unit 130 is disposed at the upper portion of the case 110 to load clothes into the case 110.

The folding unit 150 is disposed at the middle in the height direction of the case 110 to fold clothes several times along transverse lines 14 and 15 or longitudinal-lines 13.

The folding unit 150 includes a longitudinal-line folder 151 that performs longitudinal-line folding and a transverse-line folder 170 that transverse-line folding. However, the longitudinal-line folder 151 are disposed at the upper portion of the case 110 together with the loading unit 130 and can perform loading and longitudinal-line folding on clothes.

The unloading unit 190 is configured to discharge folded clothes out of the case 110.

Figure 3:
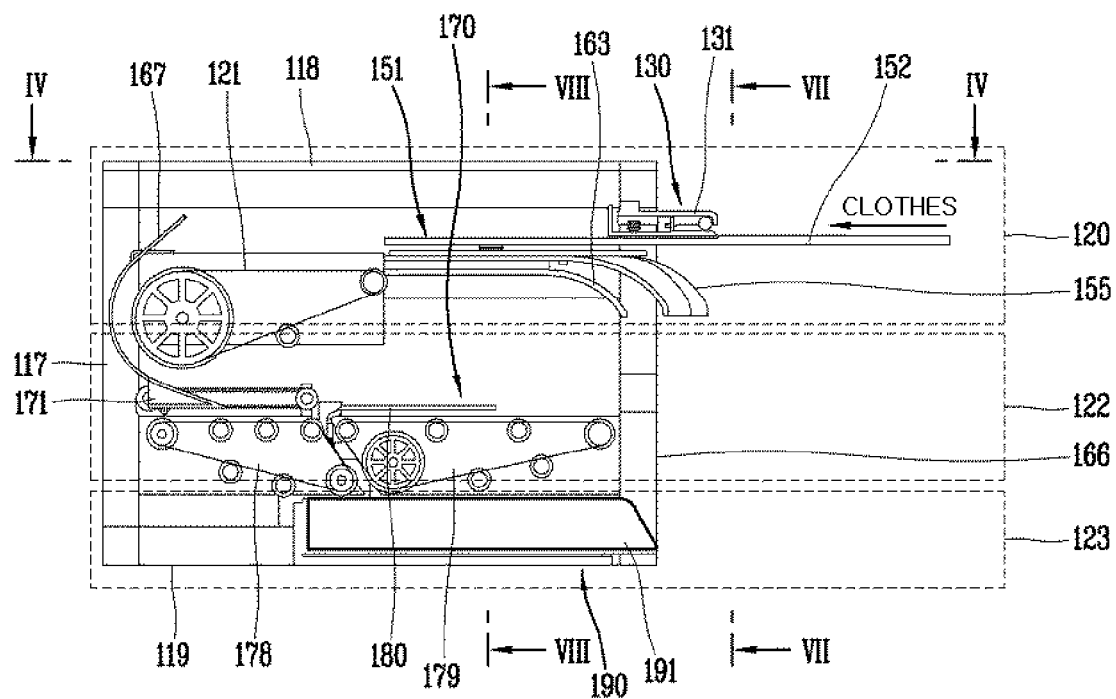
FIG. 3 is a conceptual view showing the state in which a loading unit, a folding unit, and an unloading unit are mounted in a case in FIG. 2.
Figure 4:
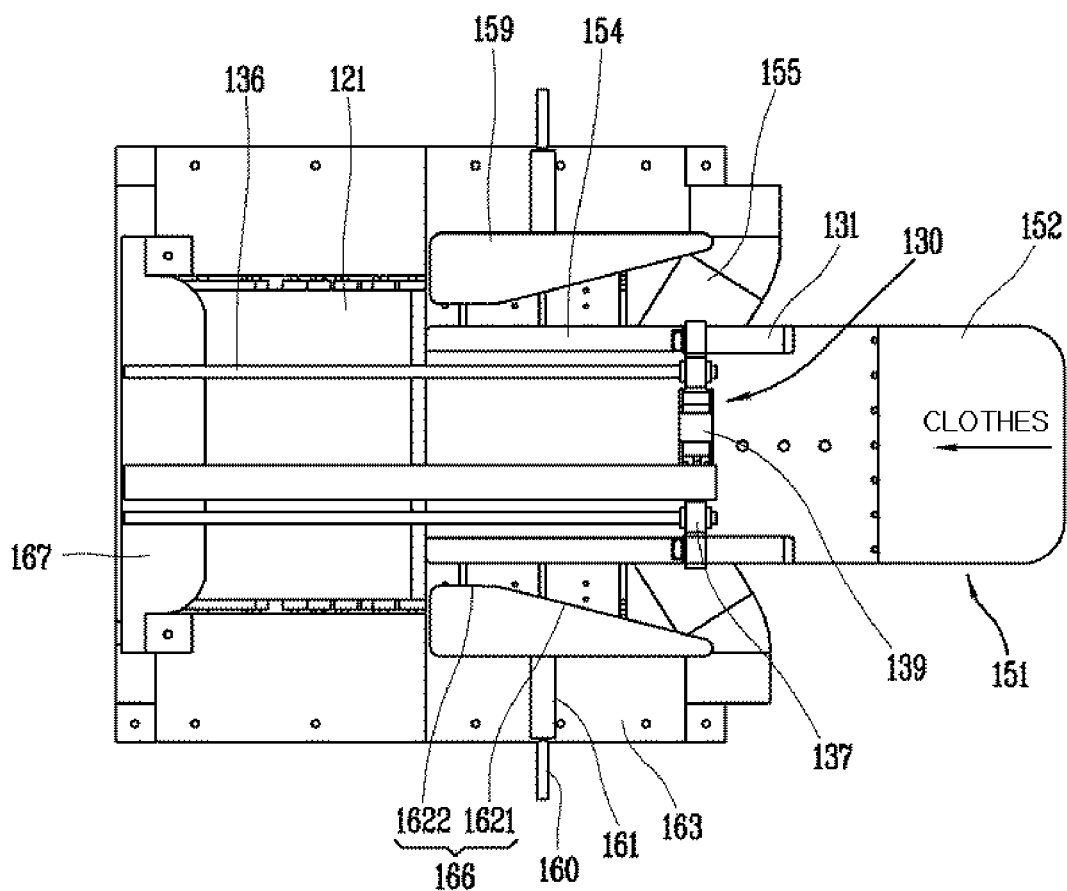
FIG. 4 is a plan view of a main board and sub-board seen from above along line IV-IV of FIG. 3.
Figure 6:
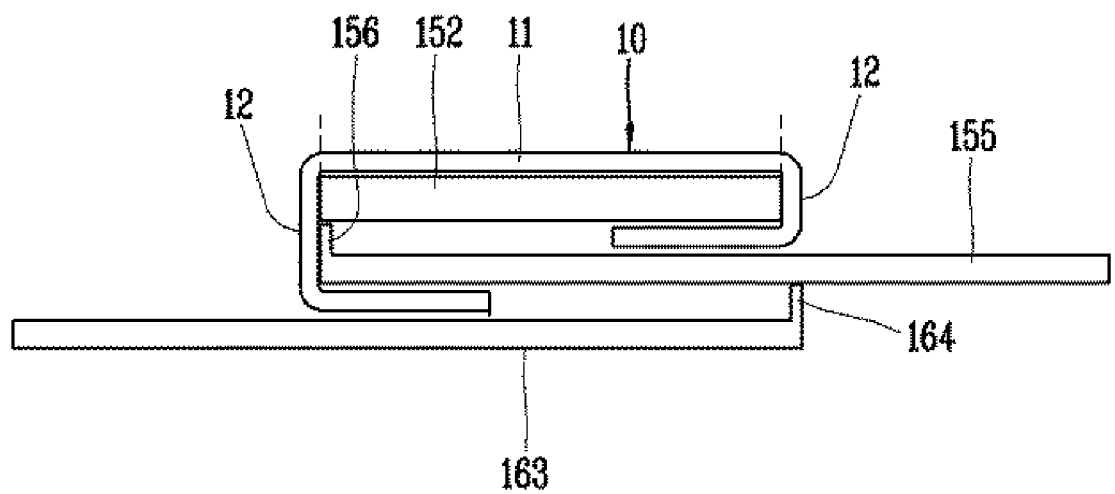
FIG. 6 is a conceptual view showing the state in which both sleeves are formed by sub-boards of FIG. 4.
Figure 7:
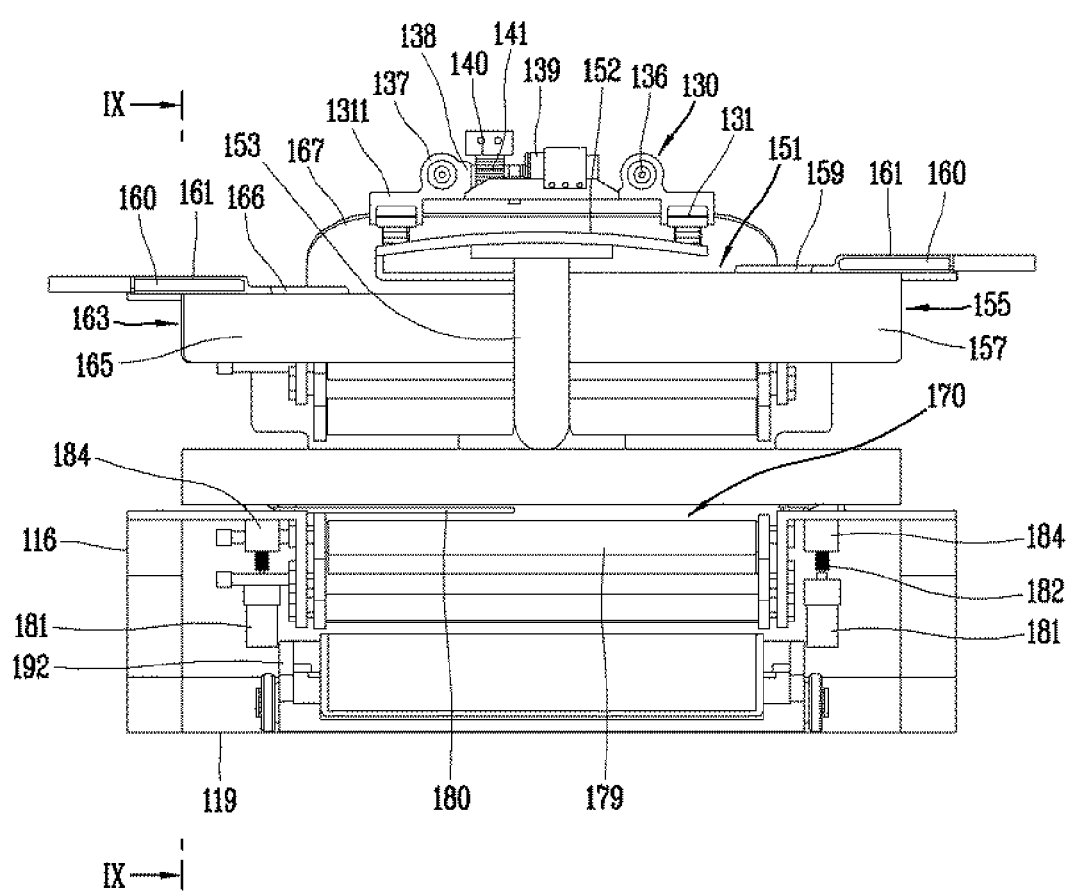
FIG. 7 is a front view taken along line VII-VII shown in FIG. 3.
Figure 8:
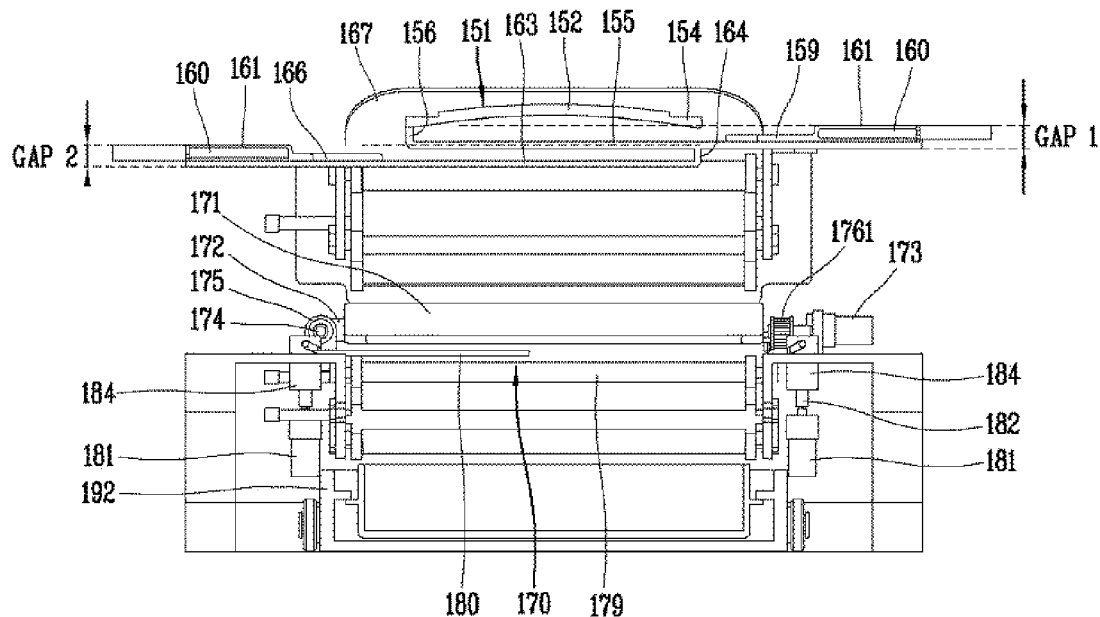
FIG. 8 is a cross-sectional view taken along line VIII-VIII of FIG. 5.
Figure 9:
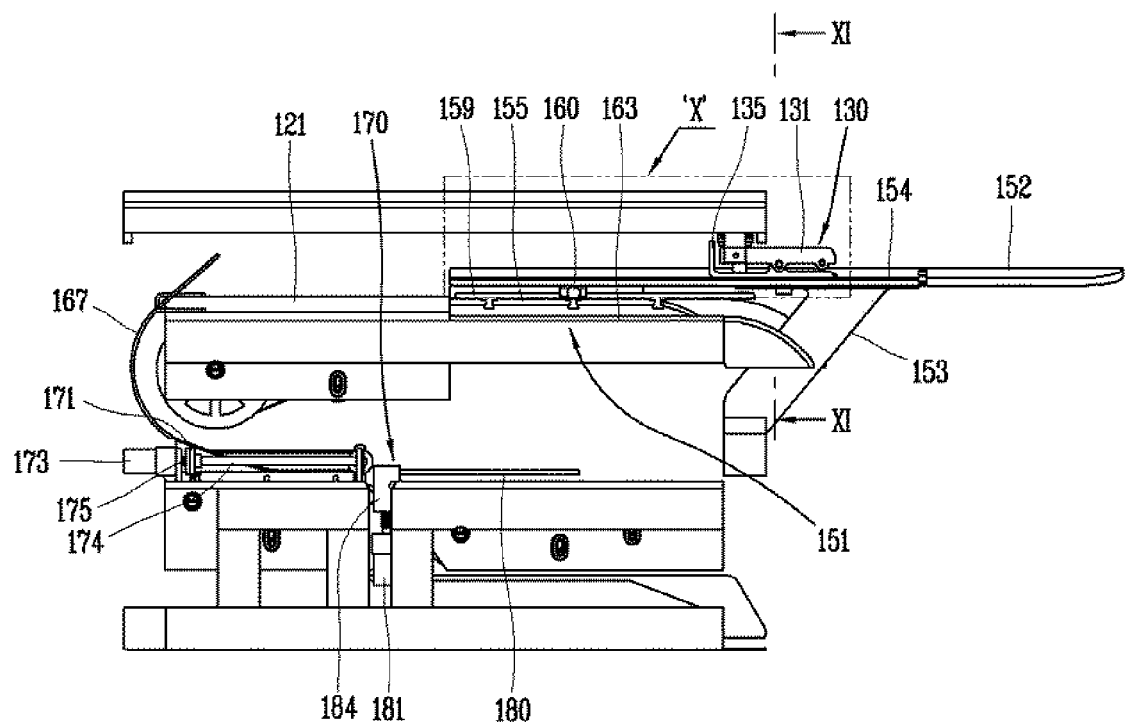
FIG. 9 is a side view taken along line IX-IX of FIG. 7.
Figure 12:
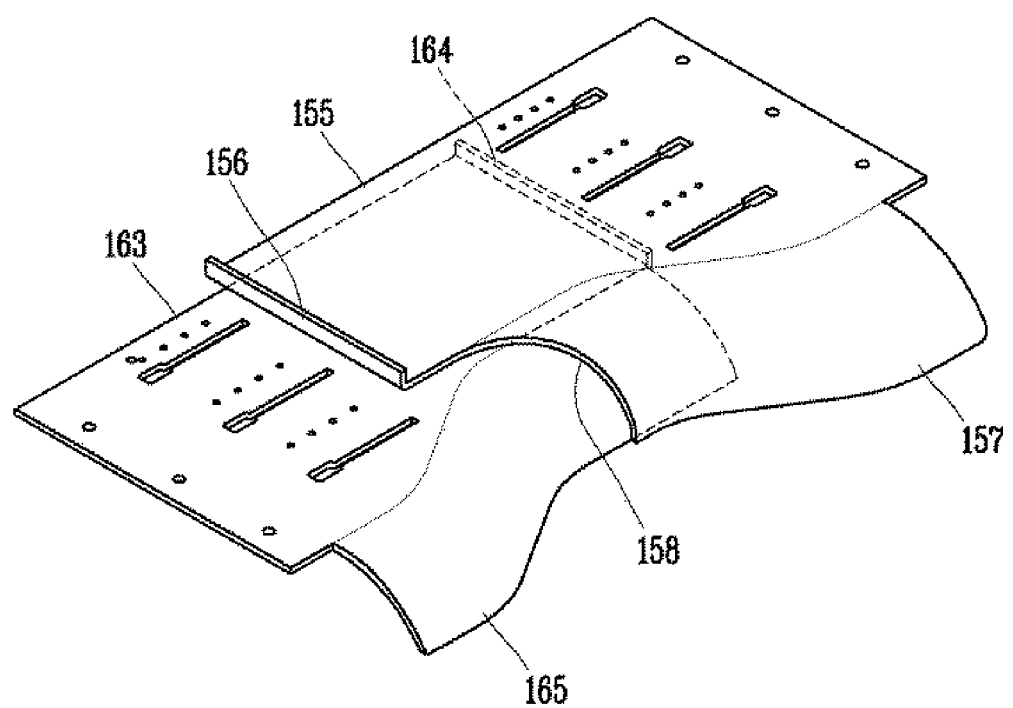
FIG. 12 is a conceptual view showing a plurality of sub-boards of FIG. 4.

FIG. 3 is a conceptual view showing the state in which the loading unit 130, the folding unit 150, and the unloading unit 190 are mounted in the case 110 in FIG. 2, FIG. 4 is a plan view of a main board 152 and sub-board seen from above along line IV-IV of FIG. 3, FIG. 5 is a conceptual view showing the state in which sleeves 12 of a top 10 hang down from the main board 152 of FIG. 4, FIG. 6 is a conceptual view showing the state in which both sleeves 12 are formed by sub-boards of FIG. 4, FIG. 7 is a front view taken along line VII-VII shown in FIG. 3, FIG. 8 is a cross-sectional view taken along line VIII-VIII of FIG. 3, FIG. 9 is a side view taken along line IX-IX of FIG. 7, FIG. 10 is an enlarged view of the portion indicated by X in FIG. 9, FIG. 11 is a cross-sectional view taken along line XI-XI of FIG. 9, and FIG. 12 is a conceptual view showing a plurality of sub-boards of FIG. 4.

A plurality of frames is installed in the case 110, thereby being able to form a framework. The frames include front frames 116, rear frames 117, top frames 118, and bottom frames 119.

The front frames 116 may be vertically installed at the left and right edges of the front surface of the case 110, respectively. The rear frames 117 may be vertically installed at the left and right edges of the rear surface of the case 110, respectively.

The top frames 118 are horizontally installed on the upper ends of the front frames 116 and the upper ends of the rear frames 117, respectively, to connect the front frames 116 and the rear frames 117 to each other.

The bottom frames 119 are horizontally installed at the lower ends of the front frames 116 and the lower ends of the rear frames 117, respectively, to connect the front frames 116 and the rear frames 117 to each other.

The loading unit 130, the folding unit 150, and the unloading unit 190 may be stacked in the case 110.

For example, when the accommodation space of the case 110 is divided into an upper stage 120, a middle stage 122, and a lower stage 123, the loading unit 130 and the longitudinal-line folder 151 of the folding unit 150 may be disposed at the upper stage 120, the transverse-line folder 170 of the folding unit 150 may be disposed at the middle stage 122, and the unloading unit 190 may be disposed at the lower stage 123.

The loading unit 130 is disposed at the top frames 118 to convey clothes into the accommodation space in the case 110.

The loading unit 130 includes a plurality of grippers 131. The grippers 131 may be configured to grip the left and right sides of the shoulder part of the top 10, respectively. The gripper 131 may be implemented like tongs. The gripper 131 includes an upper gripper member 132 and a lower gripper member 133.

Hinge portions 134 protrude at the longitudinal center portions of the upper gripper member 132 and the lower gripper member 133 to laterally overlap each other, respectively, and are coupled to each other by a hinge pin. Accordingly, the front ends of the upper gripper member 132 and the lower gripper member 133 can be opened or closed by rotating up and down about the hinge pin A small roller is installed at the front end of the upper gripper member 132, so clothes are easily inserted between the upper gripper member 132 and the lower gripper member 133 when the clothes are gripped.

A spring is installed between the rear ends of the upper gripper member 132 and the rear gripper member 133. The spring has elasticity in a direction in which the rear ends of the upper gripper member 132 and the rear gripper member 133 are opened up and down.

A release protrusion 135 that protrudes upward may be formed on the bottom of the rear end of the lower gripper member 133 to cover the rear end of the upper gripper member 132.

According to this configuration, the shoulder part of the top 10 may be gripped between the front ends of the upper gripper member 132 and the lower gripper member 133.

When the upper end of the release protrusion 135 is pressed toward the front of the gripper 131, the rear end of the lower gripper member 132 which is connected with the release protrusion 135 is rotated toward the rear end of the upper gripper member 132 against the elasticity of the spring, whereby a clothes item gripped between the front ends of the upper gripper member 132 and the lower gripper member 133 can be released.

The loading unit 130 is configured to move in the front-rear direction toward the rear surface from the front surface of the case 110.

A gripper driving unit and a guide rod 136 for moving the gripper 131 in the front-rear direction mounted on the top frame 118.

The guide rods 136 are configured to move in the front-rear direction of the case 110 with the grippers 131 hanging thereon, respectively. A gripper support 1311 may be formed in a "E" shape or a "U" shape and coupled to the rear end of the upper gripper member 132 of the gripper 131.

The guide rod 136 may be a circular bar. Conveying guides 154 may be horizontally elongated toward the rear surface from the front surface of the case 110.

The guide rods 136 are mounted on the top frames 118, respectively, to be laterally movable left and right, so the gap therebetween can be adjusted. The gaps between the grippers 131 can be adjusted together with the guide rods 136 in accordance with the sizes of clothes.

Each of a plurality of guide rings 137 extends toward the guide rod 136 from a side of the gripper support 111, is formed in a cylindrical shape to surround the guide rod 136, and can be moved in the front-rear direction with the gripper 131 hanging thereon.

The guide rings 137 may be connected by a transverse member 138 horizontally extending left and right. The transverse member 138 may connect the guide rings 137 as one or two members.

For example, in order to adjust the lateral gap between the gripper 131, the transverse members 138 are configured such that any one of two circular pipes having different diameters is longitudinally inserted into and pulled out of the other one to be able to adjust the length, whereby the lateral gap of the transverse members 138 can be adjusted.

The gripper driving unit includes a gripper-driving motor 139 and a power transmitter. The power transmitter may be implemented by a rack gear 140 and a pinion gear 141. The gripper-driving motor 139 may be mounted on the transverse member 138.

The pinion gear 141 may be connected by a rotary shaft laterally extending from the griper-driving motor 139. The rack gear 140 may horizontally extend in the front-rear direction from the front end to the rear end of the top frame 118.

A plurality of gear teeth is formed on the bottom of the rack gear 140, so the rack gear can be engaged with the pinion gear 141.

The rotary shaft may be connected to the guide ring 137 through the pinion gear 141 from the gripper-driving motor 139.

According to this configuration, when the gripper-driving motor 139 is operated, the pinion gear 141 is rotated with the rotary shaft and is moved in the front-rear direction along the rack gear 140, whereby the gripper 131 can be moved in the front-rear direction.

The longitudinal-line folder 151 may be configured such that loading and longitudinal-line folding of a clothes item can be finished on one stage. For example, the longitudinal-line folder 151 can finish folding along the longitudinal line 13 at the upper stage 120.

To this end, the longitudinal-line folder 151 is disposed at the upstream side of the path of clothes and includes a main board 152 and a plurality of sub-boards 155 and 163.

The main board 152 is configured to support the body part 11 of the top 10 and to be able to slide in the front-rear direction from the front surface to the rear surface of the case 110.

The main board 152 may be formed in a rectangular shape when seen downward from the top surface of the case 110. The corners of the main board 152 may be rounded. The main board 152 may be formed such that that longitudinal length (length) is larger than the transverse length (width).

The length of the main board 152 may be larger twice or more than the width. The width of the main board may be smaller than the shoulder width of the top 10.

According to this configuration, portions of both sides of the body part 11 and both sleeves 12 of the top 10 may hang down in the gravity direction from both side edges while the main board 152 supports the body part 11 of the top 10.

Since both sides of the body part 11 of the top 10 are curved in the gravity direction along both side edges of the main board 152, both side edges of the main board 152 can longitudinally form longitudinal lines 13 from the shoulder lines at both sides of the body part 11.

The front of the main board 152 protrudes forward further than the front ends of the sub-board 155 and 163, so the top 10 can be easily loaded. The protrusion length of the front of the main board 152 may be larger than the distance from a transverse straight line passing the ends of both shoulder lines of the top 10 to the upper end of the center of the neck part.

The front of the main board 152 protruding further than the sub-boards 155 and 163 is inclined downward, so the top 10 can be smoothly loaded.

For example, a longitudinal side of the top 10 is positioned higher than the other side of the top 10 as it goes to the upper portion of the front of the main board 152, so the shoulder part of the top 10 is easily gripped between the upper gripper member 132 and the lower gripper member 133.

The main board 152 may be convexly protrude upward at the center portion further than both side edges when seen rearward from the front of the case 110. The main board 152 may be formed in a curved arc shape.

According to this configuration of the main board 152, an effect that the body part 11 of the top 10 is straightened to both left and right edges from the center of the main board 152 by gravity.

The sub-board 155 and 163 are spaced apart from each other under the main board 152.

The sub-board 155 and 163 are configured to laterally fold a portion of the body part 11 of the top 10 and both sleeves 12, which hang down in the gravity direction from both side edges of the main board 152, along the longitudinal lines 13 toward the back of the top 10 without interference therebetween.

The sub-boards 155 and 163 include a first sub-board 155 and a second sub-board 163. An end of each of the first sub-board 155 and the second sub-board 163 may be attached to the left and right side panels 113 or may be attached and supported to the left and right side frames connecting the centers of the front frame 116 and the rear frame 117.

The first sub-board 155 may horizontally extend toward the left side from the right side of the case 110. The second sub-board 163 may horizontally extend toward the right side from the left side of the case 110.

The first sub-board 155 and the second sub-board 163 may be disposed at the left and right sides of the main board 152, respectively, with different height differences from the main board 152.

The first sub-board 155 and the second sub-board 163 may be spaced apart from each other in the up-down direction. The first sub-board 155 and the second sub-board 163 may be disposed to partially overlap each other in the up-down direction.

The first sub-board 155 and the second sub-board 163 may be disposed to partially overlap the main board 152 in the up-down direction.

The first sub-board 155 may extend to a second edge (left edge) across a first edge (right edge in the figures) of the main board 152 while maintaining a predetermined first gap GAP 1 with respect to the main board 152.

The second sub-board 163 is disposed under the first sub-board 155 and may extend to the first edge (right edge) across the second edge (left edge) of the main board 152 while maintaining a second gap with respect to the first sub-board 155.

According to this configuration, when the top 10 is conveyed rearward from the front end of the main board 152 by the loading unit 130, the first sub-board 155 can fold a first portion of the body part 11 and a first sleeve 12 of the top 10 which hang down in the gravity direction from a side edge of the main board 152 along the longitudinal line 13.

The second sub-board 163 can fold a second portion of the body part 11 and a second sleeve 12 of the top which hang down in the gravity direction from a side edge of the main board 152 along the longitudinal line 13.

Accordingly, since the first sub-board 155 and the second sub-board 163 are spaced apart from each other with different height differences with respect to the main board 152, while the top 10 passes the main board 152 and the sub-boards 155 and 163 simultaneously with loading, both sleeves 12 are simultaneously folded without interference with each other at the upper stage 120 of the case 110.

The first sub-board 155 and the second sub-board 163 each may further have a first side cover 156 and a second side cover 164.

The first side cover 156 may protrude upward from a first end of the first sub-board 155 to cover the first gap GAP 1 between the second edge of the main board 152 and a first end of the first sub-board 155.

According to this configuration, the first sub-board 155 allows the first sleeve 12 of the top 10 to be laterally folded and inserted between the main board 152 and the first sub-board 155 through the gap GAP 1 between the first sub-board 155 and the first edge of the main board 152, but the first side cover 156 not only can prevent the second sleeve 12 from being inserted between the main board 152 and the first fixed plate 155 through the first gap GAP 1, but can prevent the first sleeve 12 folded already from separating out of the first sub-board 155.

The second sub-board 163 allows the second sleeve 12 of the top 10 to be laterally folded and inserted between the main board 152 and the second sub-board 163 through the gap GAP 2 between the second sub-board 163 and the second edge of the main board 152, but the second side cover 164 not only can prevent the first sleeve 12 from being inserted between the first sub-board 155 and the second sub-board 163 through the second gap GAP 2, but can prevent the second sleeve 12 folded already from separating out of the second sub-board 163.

The first side cover 156 and the second side cover 164 support portions of both sides of the body part 11 of the top 10 hanging down in the gravity direction from both side edges of the main board 152, respectively, thereby being able to laterally guide both sleeves 12 of the top to the first gap GAP 1 the second gap GAP 2 spaced apart from each other.

A support 153 for supporting the front lower portion of the main board 152 may be disposed at the front frame 116. The support 153 extends to be inclined in the front-rear direction, the lower end of the support 153 is coupled to a transverse connection frame connecting the middle portions of both sides of the front frame 116, and the upper end of the support frame 153 is coupled to a side of the bottom surface of the main board 152, thereby being able to support the main board 152.

A first entry guide 157 may be disposed at the front end of the first sub-board 155. The first entry guide 157 may be inclined downward at a predetermined angle from the front end of the first sub-board 155 or may be curved toward the front and the lower portion of the first sub-board 155 with a predetermined curvature.

In this embodiment, the first entry guide 157 is shown as a curved shape. The first entry guide 157 is formed to bend downward as it goes forward from the first sub-board 155.

According to this configuration, the first entry guide 157 lifts the first sleeve 12 hanging down in the gravity direction from the first edge of the main board 152 when the top 10 approaches the first sub-board 155, so the first sleeve 12 easily approaches.

A second entry guide 165 may be disposed at the front end of the second sub-board 163. The second entry guide 165 may be inclined downward at a predetermined angle from the front end of the second sub-board 163 or may be curved toward the front and the lower portion of the second sub-board 163 with a predetermined curvature.

In this embodiment, the second entry guide 165 is shown as a curved shape. The second entry guide 165 is formed to bend downward as it goes forward from the second sub-board 155.

According to this configuration, the second entry guide 165 lifts the second sleeve 12 hanging down in the gravity direction from the second edge of the main board 152 when the top 10 approaches the second sub-board 163, so the second sleeve 12 can easily approach.

The first entry guide 157 may be formed to be recessed toward the rear from the front as it goes from the right side to the left side in the width direction. The right end of the first entry guide 157 may protrude forward further than the left end (recessed portion) of the first entry guide 157.

The second entry guide 165 may be formed to be recessed toward the rear from the front as it goes from the left side to the right side in the width direction. The left end of the second entry guide 165 may protrude forward further than the right end (recessed portion) of the second entry guide 165.

The left end (recessed portion) of the first entry guide 157 may protrude forward further than the right end (recessed portion) of the second entry guide 165.

According to this configuration, the first entry guide 157 and the second entry guide 165 can guide both sleeves 12 to be laterally folded toward each other, respectively, when both sleeves 12 approach the first sub-board 155 and the second sub-board 163, respectively.

The first entry guide 157, when seen from the front of the case 110, may be spaced away from the main board 152 with a gap therebetween as it goes from the right end to the left end of the first sub-board 155 in the width direction such that the front left end of the first entry guide 157 extends to the width-directional center of the main board 152 across the first edge (right edge) of the main board 152.

The second entry guide 165, when seen from the front of the case 110, may be spaced away from the main board 152 with a gap therebetween as it goes from the left end to the right end of the first sub-board 155 in the width direction such that the front right end of the second entry guide 165 extends to the first edge (right edge) of the main board 152 across the second edge (left edge) of the main board 152.

The first entry guide 157 and the second entry guide 165 may be disposed to partially overlap in the front-rear direction and the up-down direction.

An opening 158 may be formed at the left end of the first entry guide 157. The opening 158 may be rounded. The lateral length of the first entry guide 157 may be smaller by the lateral distance of the opening 158 than the lateral length of the second entry guide 165.

According to this configuration, when the top 10 is loaded and conveyed rearward, the first entry guide 157 allows the right sleeve 12 to approach the first sub-board 155 while lifting the right sleeve 12 and the second entry guide 165 lifts the left sleeve 12. The opening can prevent the left sleeve 12 from interfering with the first entry guide 157 when the left sleeve 12 approaches the second sub-board 163.

The first sub-board 155 and the second sub-board 163 may have folding guides 159 and 166, respectively. The folding guides 159 and 166 may be configured to push both sleeves 12 or restrict both sleeves 12 not to come out of the longitudinal lines 13 when both sleeves 12 of the top 10 approach the first sub-board 155 and the second sub-board 163.

The folding guides 159 and 166 may include a first folding guide 159 disposed at the first sub-board 155 and a second folding guide 166 disposed at the second sub-board 163.

The folding guides 159 and 166 may be mounted on the sub-boards 155 and 163 to be laterally movable or may be integrally fixed to the sub-boards 155 and 163.

The movable folding guides 159 and 166 may horizontally extend with a constant thickness, as shown in FIG. 6.

The movable folding guides 159 and 166 may be connected with folding guide driving motors (not shown) and can be driven. A ball screw 160 is connected with a rotary shaft of the folding guide driving motor and can be rotated. The ball screw 160 is configured to convert the rotational motion of the motor into a straight motion.

A lateral moving member 161 is formed in a circular pipe shape, a female thread portion is spirally formed on the inner surface of the lateral moving member 161, and a plurality of ball bearings is installed between the inner surface of the lateral moving member 161 and the ball screw 160, so the lateral moving member 161 may be configured to be moved straight by rotation of the ball screw 160.

The lateral moving member 161 is connected to an edge of the folding guides 159 and 166, so the folding guides 159 and 166 can be laterally moved with the lateral moving members 161 by rotation of the folding guide driving motors and the ball screws 160.

A plurality of guide protrusions may protrude downward from the bottom surfaces of the folding guides 159 and 166 and a plurality of guide grooves may laterally extend on the sub-boards. The guide protrusions are inserted and laterally slid in the guide grooves, respectively, thereby being able to guide movement of the folding guides 159 and 166.

According to this configuration, when the top 10 passes the sub-boards and both sleeves 12 are opened or pushed outward from both side edges of the main board 152, the folding guides 159 and 166 can push a portion of the body part 11 or the sleeves 12 of the top 10 inside both side edges of the main board 152.

The first folding guide 159 and the second folding guide 166 may be mounted to be movable in opposite directions.

The first folding guide 159 and the second folding guide 166 each may have a width reducing portion 1621 and a fold maintaining portion 1622.

The width reducing portion 1621 and the fold maintaining portion 1622 may be formed at the front portion and the rear portion of the lateral inner edge of the folding guides 159 and 166, respectively.

The width reducing portion 1621 may be inclined such that the width of the folding guide 159, 166 is increased as it goes from the front end to the rear end of the first folding guide 159 like the hypotenuse of a right triangle.

The width reducing portion 1621 of the first folding guide 159 and the width reducing portion 1621 of the second folding guide 166 may be formed such that the lateral gap therebetween decreases rearward from the front ends of the folding guides 159 and 166.

According to this configuration, the width reducing portions 1621 can guide both sleeves 12 to be laterally folded by pushing them inside both side edges of the main board 152 when the sleeves 12 pass the sub-boards.

The fold maintaining portions 1622 are formed in parallel with both side edges of the main board 152, thereby being able to keep the top 10 folded along the longitudinal line when the top 10 is conveyed rearward in the case 10.

The width reducing portion 1621 and the fold maintaining portion 1622 may be formed to have different lengths.

Conveying guides 154 may be concavely formed in the transverse direction on the top surface of both side edges of the main board 152. The conveying guides 154 may be stepped downward from the top surfaces of both side edges of the main board 152.

The conveying guide 154 is formed flat and the width of the conveying guide 154 may be the same as or slightly larger than the left-right width of the gripper 131.

The length of the conveying guide 154 may correspond to the movement range of the gripper 131 that is moved reward from the front surface of the case 110. The conveying guide 154 does not need to be formed at the front of the main board 152 that protrudes forward from the front surface of the case 110.

The bottom surface of the gripper 131 is positioned lower than the top surface of the main board 152.

The bottom surface of the gripper 131 may be spaced apart from the conveying guide 154 in the up-down direction with a predetermined gap 1790 within 2 mm therebetween.

According to this configuration, since the conveying guide 154 is spaced apart from the bottom surface of the gripper 131 with a predetermined gap 1790 therebetween, the conveying guide 154 can guide the gripper 131 moving in the front-rear direction with the bottom surface of the gripper 131 maintaining the gap 1790 from the conveying guide 154.

Further, since the bottom surface 131 is spaced apart from the top surface of the conveying guide 154 with a gap, for example, within 2 mm, when the top 10 is loaded, the height difference between the should part of the top 10 that is gripped by the grippers 131 and the bottom part 11 of the top 10 which is placed on the main board 152 can be minimized.

When a gap over a good size (e.g., over 2 mm) is generated between the bottom surface of the gripper 131 and the conveying guide 154 of the main board 152, the shoulder line portion of the top 10 is folded while being lifted by the gap from the conveying guide.

Accordingly, when the top 10 is released from the grippers 131, the shoulder line portions of the top 10 lifted up are moved down to the upper conveyer 121 in the gravity direction, so there may be a problem the longitudinal lines 13 supposed to be formed at both shoulder line portions of the top 10 are twisted unlike the intention.

Accordingly, it is preferable to minimize the height of the shoulder line portions lifted from the top surface of the main board 152 by positioning the bottom surfaces of the grippers 131 as close as possible to the conveying guides 154 on the surfaces of both side edges of the main board 152 with a minimum gap therebetween.

A conveyer for conveying clothes is disposed in the case 110.

The conveyer may be composed of an upper conveyer 121, a middle conveyer, and a lower conveyer 192.

The upper conveyer 121, the middle conveyer (corresponding to a first conveyer 178 and a second conveyer 179 in the present disclosure), and the lower conveyer 192 each may include a conveyer-driving motor, a plurality of rollers, and a belt 177. The conveyer-driving motor may be configured to rotate the conveyer belt.

The rollers are connected with the conveyer-driving motor through a shaft and can be rotated by power transmitted through the shaft. The rollers are configured to rotate the belt 177. The belt 177 surrounds and connects the rollers, thereby being able to rotate with the rollers.

The belt 177 can be rotated forward and backward by the conveyer-driving motor and clothes can be placed and conveyed on the belt 177.

The upper conveyer 121 can convey the top 10 folded along the longitudinal line to the rear of the case 110 from the longitudinal-line folder 151. The upper conveyer 121 can convey the top 10 released from the grippers 131 to the middle stage 122.

A reverse guide 167 may be formed by bending a rectangular plate having a predetermined thickness in an arc shape.

The upper end of the reverse guide 167 extend to protrude over the top surface of the upper conveyer 121 and the lower end of the reverse guide 167 may extend to the rear upper end of a push board 171, which will be described below, to deliver the top 10 onto the push board 171 of the transverse-line folder 170.

The center portion of the reverse guide 167 is curved in an arc shape, whereby the conveying direction of the top 10 that is conveyed to the rear of the case 110 can be changed.

The top surface of the top 10 (the front of the top 10 when seen from above) is turned over while being moved along the reverse guide 167 by the upper conveyer 121.

The reverse guide 167 surrounds the rear end of the upper conveyer 121 to prevent clothes from departing from the path.

Figure 13:
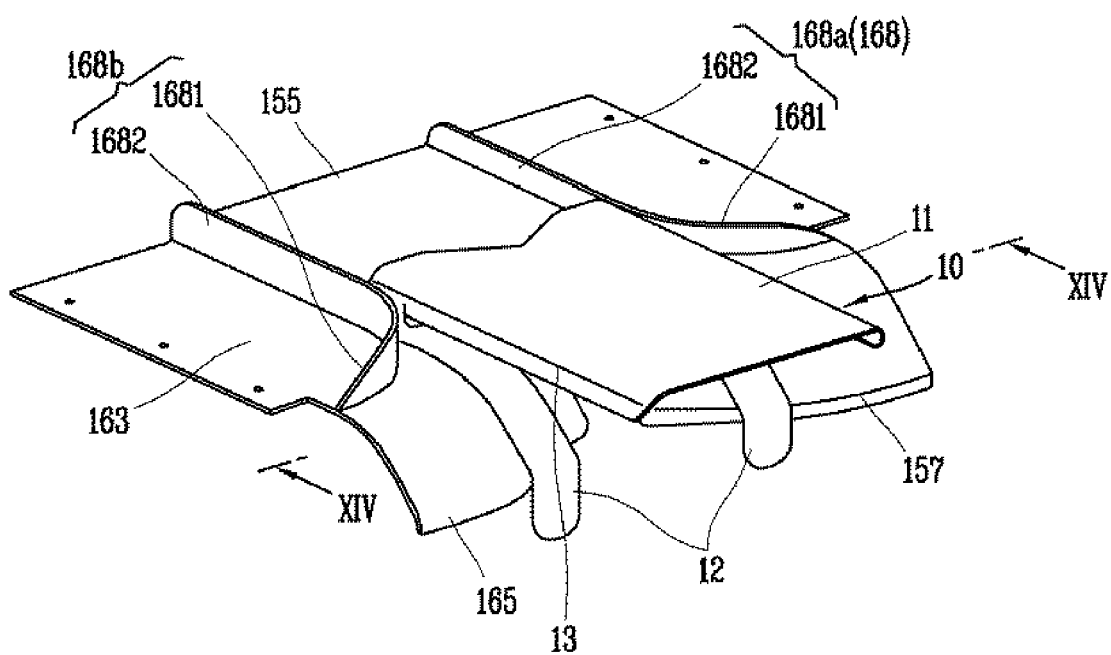
FIG. 13 is a conceptual view showing the state in which a top is folded by the sub-boards of FIG. 4.
Figure 14:
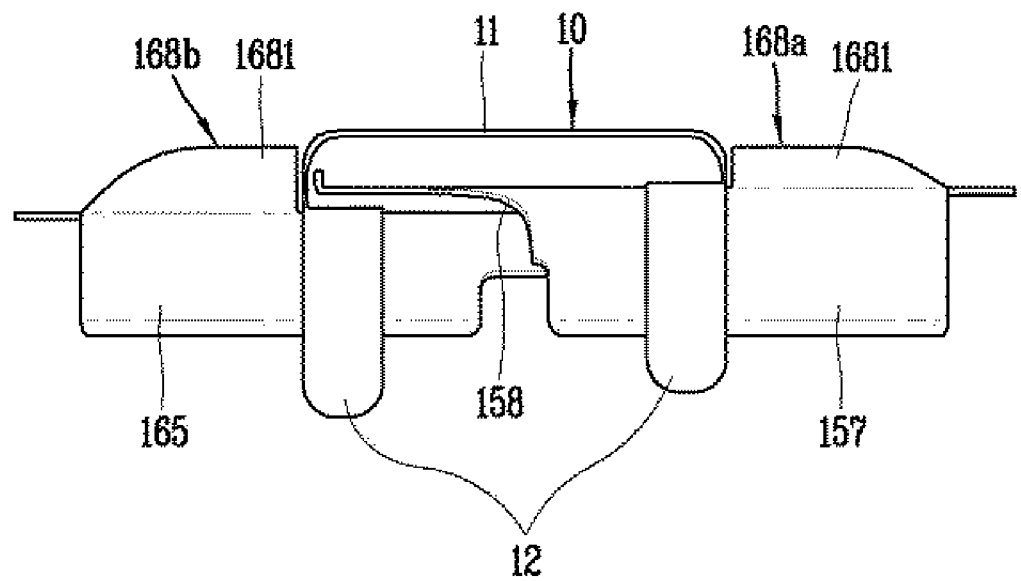
FIG. 14 is a front view taken along line XIV-XIV shown in FIG. 13.

FIG. 13 is a conceptual view showing the state in which a top 10 is folded by the sub-boards of FIG. 4 and FIG. 14 is a front view taken along line XIV-XIV shown in FIG. 13.

This embodiment is different from the embodiment shown in FIGS. 1 to 12 in than folding guides 168 are fixedly formed on the sub-boards. Other components are the same as or similar to those of the previous embodiment, so repeated description is omitted.

The folding guide 168 may be composed of a first folding guide 168a and a second folding guide 168b. The first folding guide 168a may be integrally formed with the first sub-board 155 and the second folding guide 168b may be integrally formed with the second sub-board 163.

The first folding guide 168a and the second folding guide 168b each may be composed of a width reduction portion 1681 and a fold maintaining portion 1682. The width reduction portions 1681 may be disposed at the fronts of the sub-board 155 and 163 and the fold maintaining portions 1682 may be disposed at the rears of the sub-board 155 and 163.

The width reduction portions 1681 and the fold maintaining portions 1682 are disposed at sides of the sub-boards 155 and 163 from both side edges of the main board 152.

The width reduction portions 1681 may protrude upward from the top surfaces of the sub-boards 155 and 163. The width reduction portions 1681 may be curved with a predetermined curvature or may be inclined toward the side edges of the main board 152 from lateral outer ends of the sub-boards 155 and 163. In this embodiment, the width reduction portions 1681 are shown as curved shapes.

The width reduction portion 1681 may be formed to be close to the side edges of the main board 152 as it goes to the rear end from the front end in the longitudinal direction thereof. However, the lateral gap between the width reduction portion 1681 of the folding guide 168 and the side edge of the main board 152 may be minimized.

This is because when the gap between the width reduction portion 1681 and the side edge of the main board 152 is large, a portion of the body part 11 or the sleeves 12 of the top 10 may open laterally outward from the side edges of the main board 152 in folding along the longitudinal lines 13.

According to this configuration, when both sleeves 12 of the top 10 pass the sub-boards 155 and 163, the width reduction portions 1681 can guide both sleeves 12 to be folded laterally inward from the side edges of the main board 152.

The fold maintaining portion 1682 may extend in the front-rear direction from the rear end of the width reduction portion 1681 in parallel with the side edge of the main board 152.

According to this configuration, the fold maintaining portions 1682 are disposed in parallel with the longitudinal lines 13 formed at both sides of the top 10, so when the top 10 folded along the longitudinal lines 13 is conveyed by the upper conveyer 121, the top 10 can be kept folded along the longitudinal lines 13. Further, it is possible to minimize unfolding out of the longitudinal lines 13 or disheveling of at least the body part 11 and both sleeves 12 of the top 10 folded in the width direction along the longitudinal lines 13.

Although the folding guides 168 are integrally formed with the sub-boards 155 and 163 in this embodiment, the folding guides 168 may be mounted to be laterally movable with respect to the sub-boards 155 and 163.

According to this configuration, the movable folding guides 159 and 166 can adjust the gap between the folding guides 159 and 166 or can adjust the gap between the folding guides 159 and 166 and the side edges of the main board 152 in accordance with the size of clothes.

The heights of the folding guides 168 protruding upward from the sub-boards 155 and 163 may be the same as or larger than those of both side edges of the main board 152.

According to this configuration, the folding guides 168 can prevent both sides of the body part 11 of the top 10 and both sleeves 12 folded along the longitudinal lines 13 from laterally opening outward from the longitudinal lines 13 or from poking out from the folding guides 168.

Therefore, according to the present disclosure, since the sub-boards 155 and 163 are spaced apart from each other with different height differences with respect to the main board 152, when the top 10 passes the sub-boards, the sub-boards can laterally fold both sleeves 12 of the top along the longitudinal lines 13 at a time.

Accordingly, unlike the related art in which the height of folding machines is increased due to folding along the longitudinal lines 13 that is performed several time at different stages, the clothes folding machine 100 of the present disclosure completes folding along the longitudinal lines 13 at one stage simultaneously with loading, the height of the clothes folding machine 100 can be considerably decreased.

Further, the first sub-board 155 and the second sub-board 163 form passages for both sides of the body part 11 and both sleeves 12 of the top 10. Further, both sides of the body part 11 and both sleeves 12 of the top 10 pass through the passages formed between the main board 152 and the sub-boards 155 and 163, whereby clothes can be folded along the longitudinal lines 13 simultaneously with loading. Accordingly, it is possible to fold clothes along the longitudinal lines 13 while conveying the clothes minimum distance.

The first side cover 156 and the second side cover 164 protrude from the lateral ends of the first sub-board 155 and the second sub-board 163, respectively, and cover the gap 1790 between the sub-boards and the main board 152, whereby it is possible to prevent interference between both sleeves 12 when a clothes item passes through between the main board 152 and the first and second sub-boards 163.

Further, since a folding guide is mounted on each of the first sub-board 155 and the second sub-board 163, both sleeves 12 are guided to be laterally folded toward the insides of the side edges of the main board 152 when a clothes item passes the main board 152 and the first and second sub-boards, whereby folding along the longitudinal lines 13 is easy.

Further, since the main board 152 is curved such that the lateral center portion protrudes upward further than both side edges, there is an effect of straightening a clothes item placed on the main board 152 when the clothes item is conveyed.

Further, the conveying guides 154 recessed flat on the tops of both side edges of the main board 152 and the grippers 131 are moved in the front-rear direction while the bottom surfaces thereof maintain the minimum gap 70 from the conveying guides 154, thereby minimizing the shoulder part of a clothes item gripped by the grippers 131 and the body part 11 of the clothes item placed on the main board 152. Accordingly, it is possible to prevent the folded portions of a clothes item from being unfolded outside the longitudinal lines 13 when the clothes item folded along the longitudinal lines 13 is released from the grippers 131 and placed on the conveyer.

Figure 15:
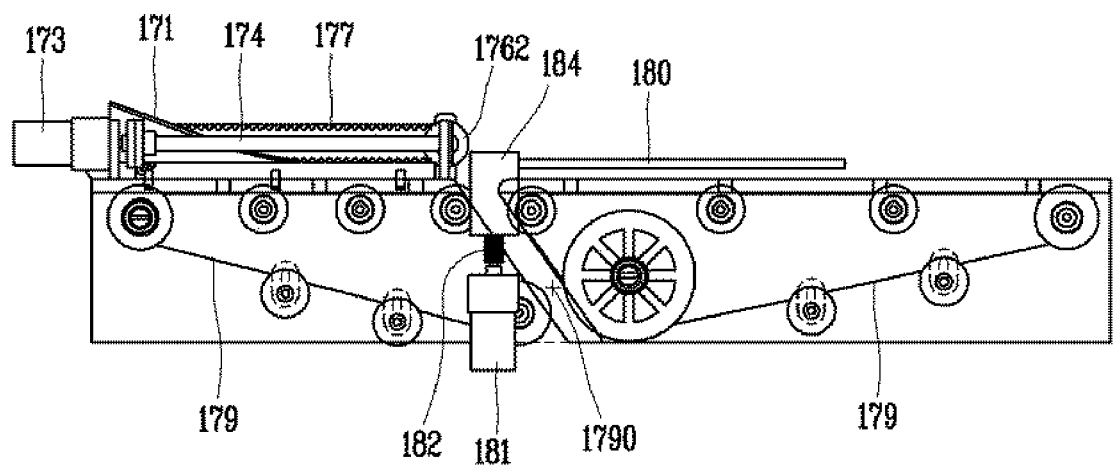
FIG. 15 is a conceptual view illustrating the configuration of a transverse-line folder in FIG. 3.
Figure 16:
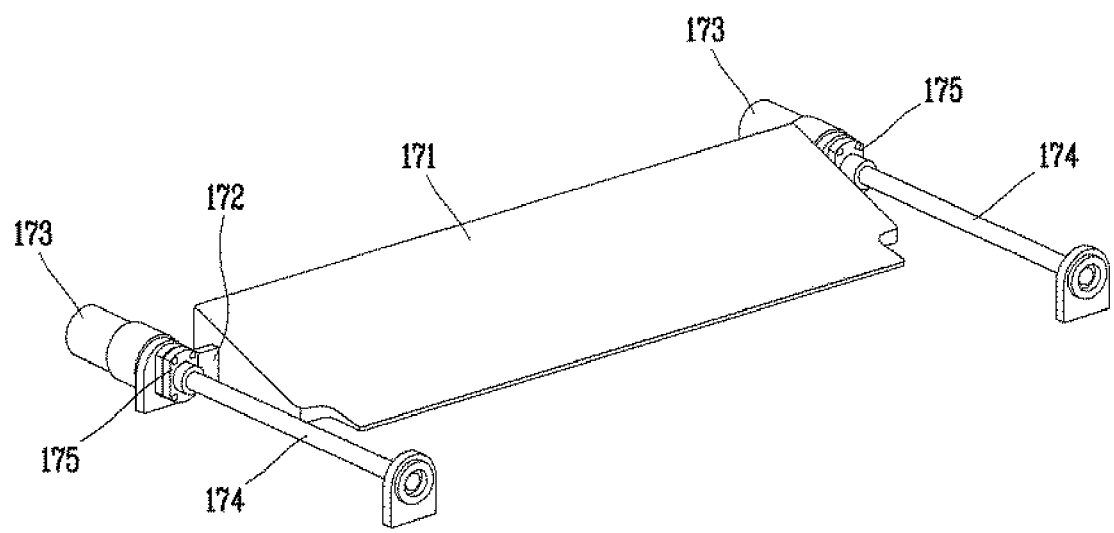
FIG. 16 is a conceptual view illustrating an embodiment for driving a push board in FIG. 15.
Figure 17:
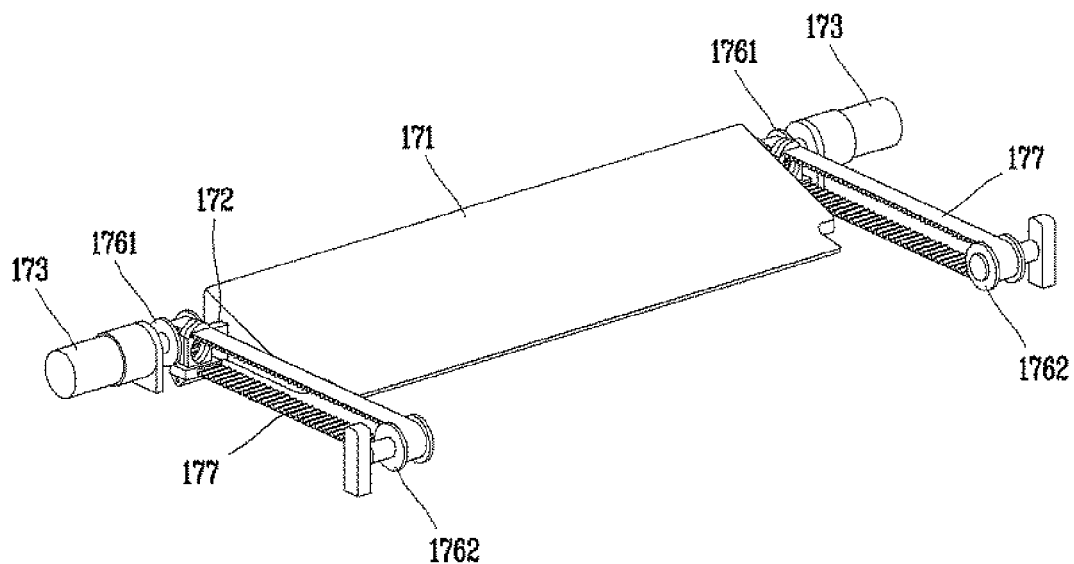
FIG. 17 is a conceptual view illustrating another embodiment for driving the push board in FIG. 15.

FIG. 15 is a conceptual view illustrating the configuration of a transverse-line folder 170 in FIG. 3, FIG. 16 is a conceptual view illustrating an embodiment for driving a push board 171 in FIG. 15, and FIG. 17 is a conceptual view illustrating another embodiment for driving the push board 171 in FIG. 15.

The transverse-line folder 170 may be disposed at the downstream side of the path of clothes. The transverse-line folder 170 may be disposed at a different stage from the longitudinal-line folder.

The transverse-line folder 170 may be composed of a primary transverse-line folder and a secondary transverse-line folder. The primary transverse-line folder is configured to fold a clothes item along a first primary transverse line 14 to overlap. The primary transverse-line folder includes a push board 171 in this embodiment.

The secondary transverse-line folder is configured to fold a clothes item along a secondary transverse line 15 to overlap. The secondary transverse-line folder includes a plurality of conveyers 178 and 179 in this embodiment.

The primary transverse-line folder and the secondary transverse-line folder may share a guide bar 180. The guide bar 180 is configured to press down the primary transverse line 14 or the secondary transverse line of clothes.

The transverse-line folder 170 is disposed at the middle stage of the case 110 and is configured to fold clothes along transverse lines 14 and 15 to be formed at longitudinal upper and lower portions of the clothes, respectively. The transverse-line folder 170 may be disposed under the longitudinal-line folder.

The transverse-line folder 170 includes the push board 171 and the conveyers 178 and 179.

The push board 171 may be installed at the rear of the middle stage 122 of the case 110 to be movable in the front-rear direction.

The conveyers 178 and 179 may be spaced apart from each other in the front-rear direction. The conveyers may be composed of a first conveyer 178 and a second conveyer 179. The first conveyer 178 may be disposed at the rear of the case 110 and the second conveyer 179 may be disposed ahead of the first conveyer 178 with a predetermined first gap GAP 1 therebetween.

The push board 171 may be disposed over the first conveyer 178. The push board may be disposed over the top surface of the first conveyer 178 with a very small gap (e.g., about 1 mm) therebetween such that it can slide in the front-rear direction with respect to the first conveyer 178.

The push board 171 may have a triangular or, preferably, right-angular cross-sectional shape and may be transversely elongated. The push board 171 may be composed of a bottom board, a top board, side boards, and a rear board.

The top board, which is a surface corresponding to the hypotenuse of a right triangle, forms the top surface of the push board 171. The bottom board may form the bottom surface of the push board 171 and may be spaced apart from the top of the first conveyer 178.

The rear board connects the bottom board and the top board to each other and forms the rear surface of the push board 171. The top board is inclined downward forward from the upper end of the rear board. The bottom board and the top board each may be formed in a substantially rectangular shape when seen from above or under the push board 171.

The side boards form both sides of the push board 171 and are disposed to laterally face each other. The side boards each may be formed in a right-triangular shape.

The side boards are configured to connect the edges of the top board, bottom board, and rear board.

A reverse guide 167 transmits clothes finished with longitudinal-line folding to the transverse-line folder 170. Clothes are moved between stages through the reverse guide 167, that is, are moved from the upper stage 120 to the middle stage 122. When clothes are moved between stages, the movement direction thereof is changed, and the front and back thereof are also switched.

The slope of the top board is disposed adjacent to the lower end of the reverse guide 167, thereby smoothly delivering a clothes item to the push board 171 through the reverse guide 167 without disconnection.

According to this configuration, a clothes item can overlap at least a portion of the slope of the push board 171 in the up-down direction.

Since a portion of clothes item overlaps at least a portion of the slope of the push board 171, the distance between the start point of movement of the clothes item and the upper portion of gap (the space between the conveyers 178 and 179 decreases, so the push board 171, the guide bar 180, and the conveyers 178 and 19 that are components of the transverse-line folder 170 can be compactly disposed with small gaps therebetween in the front-rear direction.

The right-triangular cross-section of the push board 171 makes it easy to fold clothes while pushing them forward.

Further, the right-triangular cross-section is advantageous in obliquely, not vertically, moving down clothes finished with folding along the longitudinal lines 13 to the top surface of the push board 171 when the clothes are moved down by gravity through the reverse guide 167.

A connecting portion 172 may laterally protrude from each of both sides of the push board 171. The connecting portions 172 may extend perpendicularly to the rear portions of the sides of the push board 171. The connecting portions 172 are connected with power transmission mechanisms to receive power from motors 173 for driving the push board 171.

A driving unit for driving the push board 171 may be a motor 173. The power transmission mechanisms are configured to transmit power of the motors 173 to the push board 171.

The power transmission mechanism may be implemented in the ball screw 174 (see FIG. 16) or pulley-belt type (see FIG. 17).

The power transmission mechanism of the ball screw type 174 includes a ball screw 174 and a front-rear moving member 175.

The ball screw 174 is a component that converts a rotational motion of into a straight motion. The ball screw 174 is elongated in the front-rear direction to correspond to sliding of the push board 171. A first end of the ball screw 174 is connected to a shaft extending from the motor 173.

Male threads may be formed on the outer surface of the ball screw 174. The front end and the rear end of the ball screw 174 may be rotatably supported by bearings.

The front-rear moving member 175 may be formed in a cylindrical shape. The ball screw 174 may be coupled through the front-rear moving member 175. Female threads may be formed on the inner surface of the front-rear moving member 175 for engaging with the ball screw 174.

A plurality of ball bearings may be spirally continuously installed between the female threads of the front-rear moving member 175 and the male threads of the ball screw 174.

The outer side of the front-rear moving member 175 may be connected with the connecting portion 172.

According to this configuration, when the motor 173 is operated and the ball screw 174 is rotated, the front-rear moving member 175 is moved in the front-rear direction and the push board 171 is also moved in the front-rear direction with the front-rear moving member 175.

The power transmission mechanism of the pulley-belt type includes a plurality of pulleys and a belt 177.

A plurality of pulleys 1761 and 1762 include a first pulley 1761 and a second pulley 1762 that are spaced apart from each other in the front-rear direction. The first pulley 1761 may be connected with the motor 173 through a shaft. The first pulley 1761 is a driving pulley. The second pulley 1762 is a driven pulley.

The first pulley 1761 and the second pulley 1762 may be connected by a belt 177. The gear teeth may be circumferentially formed on the outer surface of each of the first pulley 1761 and the second pulley 1762.

The belt 177 may be formed in a loop type to be hung on the first pulley 1761 and the second pulley 1762. A plurality of gear teeth may be formed on the inner surface of the belt 177 to be engaged with the gear teeth of the pulleys.

A first side of the belt 177 is connected with the connecting portion 172, thereby being able to transmit power of the motor 173 to the push board 171. The upper portion of a lateral end of the connecting portion 172 is attached to the belt 177 and a through-hole is formed at the lower portion of the lateral end of the connecting portion 172, whereby the belt 177 may pass through the lower portion of the connecting portion 172 through the through-hole.

According to this configuration, when the motor 173 is operated and the driving pulley is rotated, the belt 177 is rotated in the front-rear direction and the push board 171 is also rotated in the front-rear direction with the belt 177.

The first conveyer 178 and the second conveyer 179 each may be composed of a plurality of rollers and a belt 177. One of the rollers may be configured to be rotated by the motor 173, etc.

The rollers may be formed in a cylindrical shape of which the length is larger than the diameter. The rollers may be different in size. The rollers may be spaced apart from each other at the three apexes of a triangle to be disposed inside the belt 177. Both ends of each of the rollers may be supported by bearing to be rotatable at the position.

The belt 177 may be disposed to connect the rollers. For example, the belt 177 may be configured to surround the rollers at the three apexes of a triangle.

According to this configuration, when the motor 173 is operated, the rollers are rotated and the belt 177 can be rotated forward or backward.

Two of the rollers are horizontally spaced apart from each other in the front-rear direction and a first flat surface of the belt 177 which surrounds the two rollers is horizontally disposed, whereby clothes can be conveyed in the front-rear direction.

A predetermined gap 1790 may be formed between the first conveyer 178 and the second conveyer 179. The front of the first conveyer 178 and the rear of the second conveyer 179 are inclined forward and rearward, respectively, in parallel with each other. The predetermined gap 1790 can be maintained forward and downward.

The configuration that the front of the first conveyer 178 and the rear of the second conveyer 179 are inclined means that the first flat surface of the belt 177 which surrounds a plurality of rollers is inclined.

Two of the rollers are spaced apart from each other at an angle forward and downward and a second flat surface of the belt 177 which surrounds the two rollers disposed at an angle is inclined, whereby clothes can be put into the gap 1790 between the two conveyers to be folded or folded clothes can be discharged through the gap 1790.

The guide bar 180 may be a bar of which the length is larger than the diameter. The guide bar 180 may be elongated and disposed across the portion between the first conveyer 178 and the second conveyer 179.

The guide bar 180 may be elongated and disposed forward in parallel with the side edges of the first conveyer 178 and the second conveyer 179.

The guide bar 180 may be disposed between the first conveyer 178 and the second conveyer 179.

A plurality of guide bars 180 may be spaced apart from each other over the gap 1790 between the first conveyer 178 and the second conveyer 179.

The guide bar 180 may be installed to be movable in the front-rear direction and an incline direction. The guide bar 180 may be disposed over the predetermined gap 1790 higher than the top surfaces of the first conveyer 178 and the second conveyer 179.

According to this configuration, the guide bar 180 can press the primary transverse line 14 or the secondary transverse line 15 of the top 10 on the top surfaces of the first conveyer 178 and the second conveyer 179 by moving down over the predetermined gap 1790.

The guide bar 180 may be installed to be able to circumferentially rotate 90 degrees. For example, the guide bar 180 may be disposed to be able to rotate 90 degrees from a first position that is the initial position where it is disposed forward and a second position crossing in the width direction between the first and second conveyers 178 and 179.

The first position is a position where the guide bar 180 opens the path of clothes forward so that clothes can be moved forward, and the second position is a position where the guide bar 180 crossing the width direction so that clothes can be longitudinally folded along a transverse line.

The unloading unit 190 may include an unloading tray 191 and an unloading driving unit. The unloading tray 191 is installed to be movable in the front-rear direction and may be configured to convey and discharge clothes finished with folding out of the case 110.

The unloading tray 191 may be configured in a rectangular box shape. The unloading tray 191 may be open on the top surface and the front surface. The unloading driving unit may be implemented as the lower conveyer 192 disposed at the lower stage 123.

The unloading driving unit may be implemented to transmit power of a motor to the unloading tray 191 using a rack and a pinion gear.

The unloading driving unit may be implemented to transmit power of a motor to the unloading tray 191 using a ball screw or transmit power of a motor to the unloading tray 191 using a pulley-belt.

Figure 18:
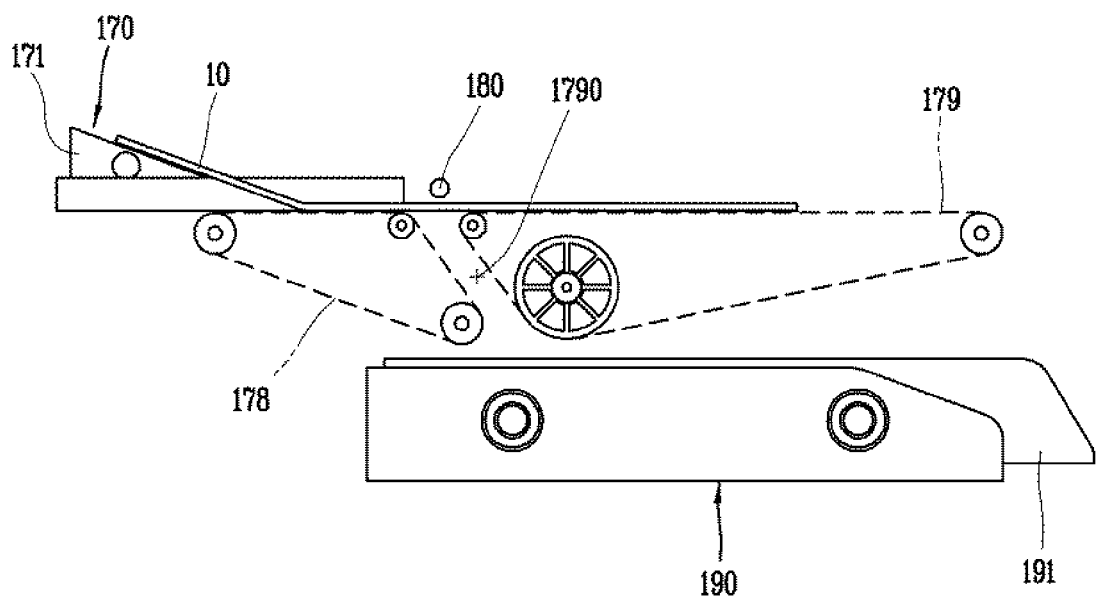
Figure 19:
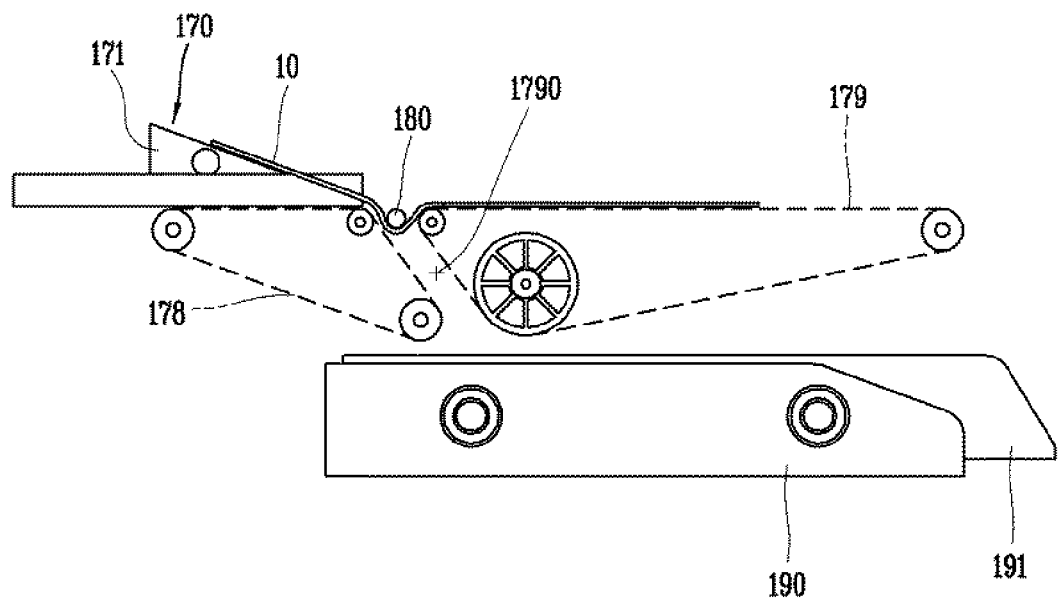
Figure 20:
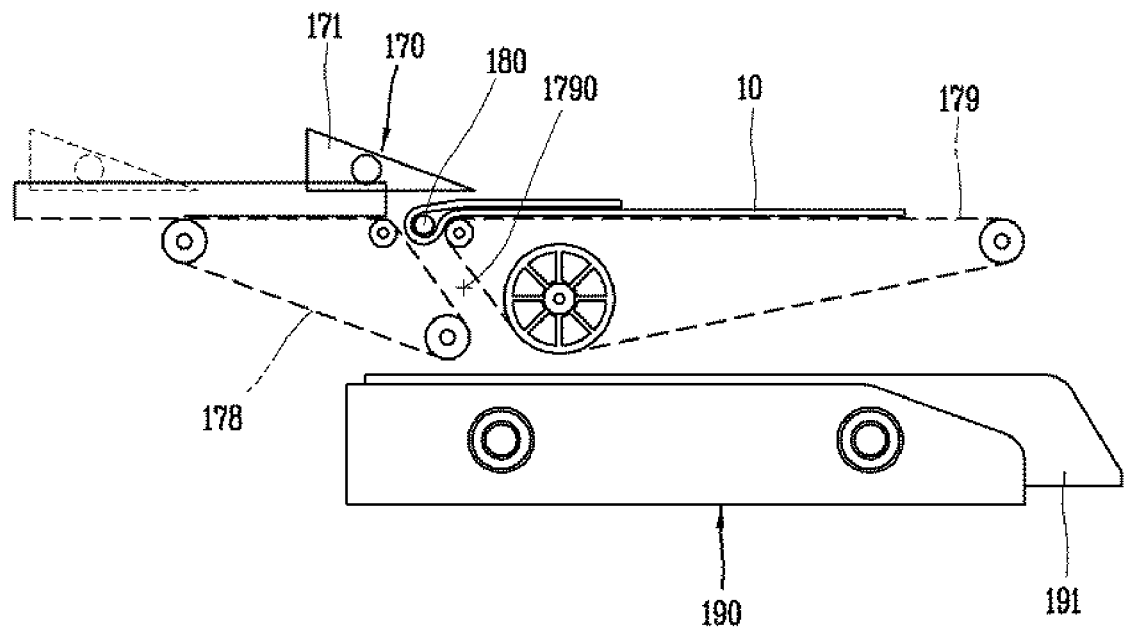
Figure 21:
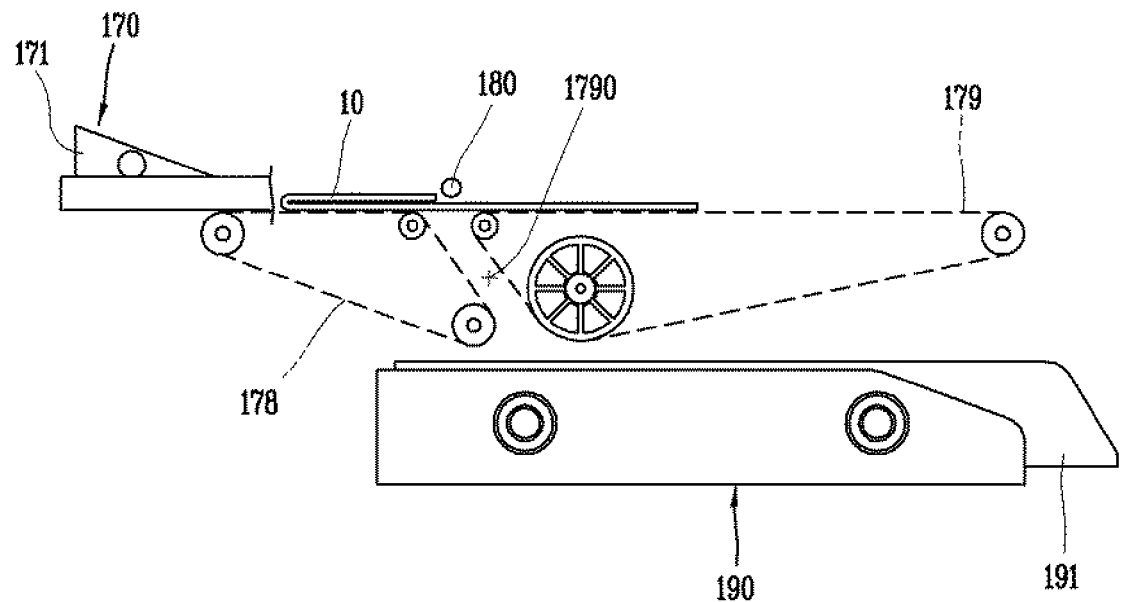
Figure 22:
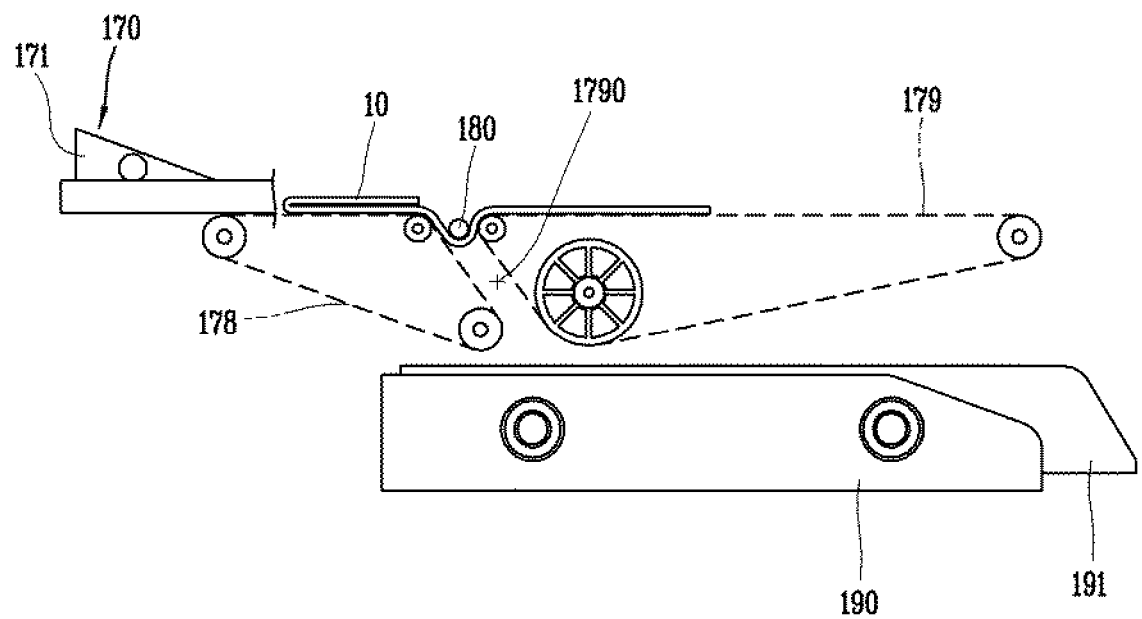
Figure 23:
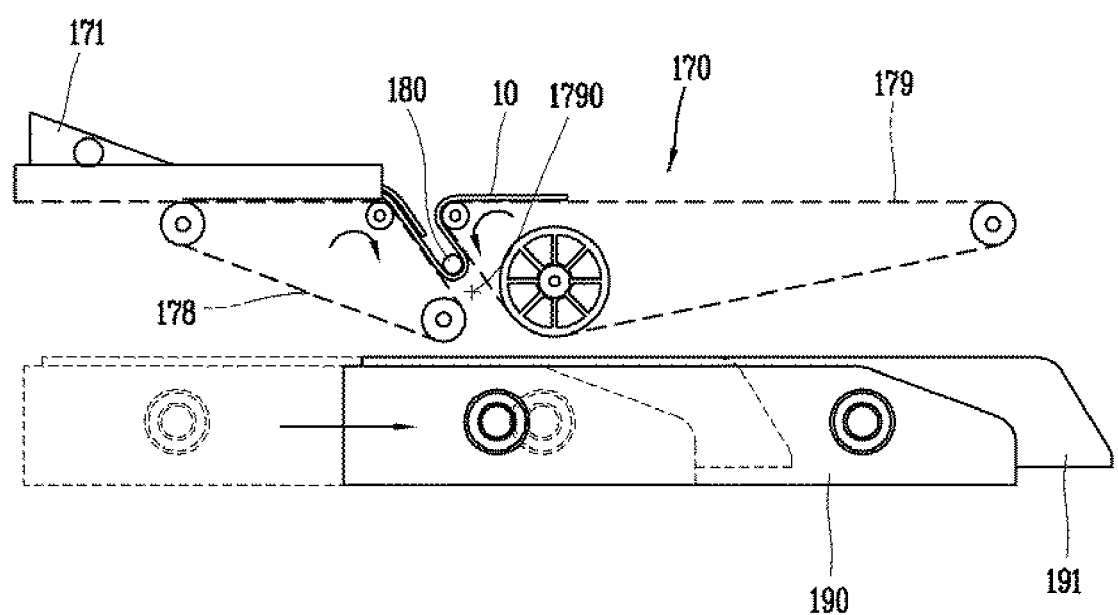
Figure 24:
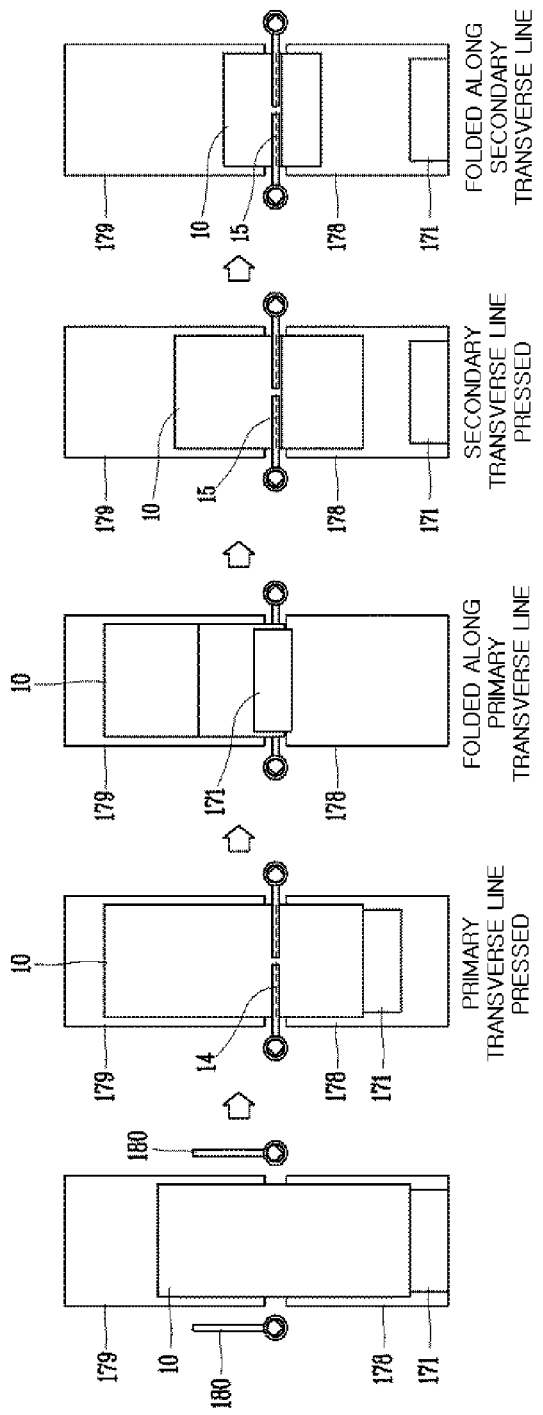

FIGS. 18 to 25 are conceptual views illustrating the operation principle of the transverse-line folder 170. In particular, FIG. 18 is a conceptual view showing the state in which a portion of a clothes item overlaps at least a portion of the slope of the push board 171, FIG. 19 is a conceptual view showing the state in which a clothes item is conveyed with a portion overlapping at least a portion of the push board, FIG. 20 is a conceptual view showing primary transverse-line folding of a clothes item, FIG. 21 is a conceptual view showing the state in which the push board is returned to the initial position and a clothes item finished with primary transverse-line folding has been moved back for secondary transverse-line folding, FIG. 22 is a conceptual view showing the state in which the guide bar 180 presses a secondary transverse line of the moved-back clothes item, FIG. 23 is a conceptual view showing the state in which the conveyers 178 and 179 push the clothes item into the gap 1790 with the secondary transverse line pressed, and secondary transverse-line folding is performed, and FIG. 24 is an operation state view showing transverse-line folding of a clothes item when the transverse-line folder 170 is seen from above.

The operation structure of the transverse-line folder 170 and a transverse-line folding method for folding along the primary transverse line 14 are described.

When the push board 171 is at the initial position at the rear of the case 110, the top surface of the push board 171 is inclined downward forward at a small angle, and a top 10 finished with folding along the longitudinal lines 13 slides onto the first conveyer 178 from the reverse guide 167.

The clothes item can be conveyed by the push board 171 and the conveyers 178 and 179 with a portion (rear end portion) overlapping at least a portion of the top surface (slope) of the push board 171.

The first conveyer 178 and the second conveyer 179 can convey clothes forward while rotating in the same direction (clockwise). The first conveyer 178 and the second conveyer 179 are controlled to convey the clothes item such that the primary transverse line 14 to be formed at a side of the top 10 and the guide bar 180 overlap each other in the up-down direction.

The guide bar 180 can rotate 90 degrees from the first position to the second position.

The guide bar 180 rotates to the second position, and then presses the primary transverse line 14 of the top 10 while moving down. The distance that the guide bar 180 moves down is set not to block the forward movement path of the push board 171.

The push board 171 moves forward and turns the top 10 forward over the primary transverse line 14 or turns the top 10 beyond the primary transverse line 14 while pushing the rear end of the top 10 pressed by the guide bar 180, whereby the top 10 is folded along the primary transverse line 14 to overlap.

Next, the push board 171 is moved back to the initial position.

Next, the guide bar 180 is lifted up to the top surfaces of the first conveyer 178 and the second conveyer 179 to come out of the top 10. Accordingly, the top 10 finished with folding along the primary transverse line 14 can be conveyed rearward toward the push board 171 without being blocked by the guide bar 180. Next, the first and second conveyers 178 and 179 convey the top 10 rearward by rotating in the same direction (counterclockwise) with the guide bar 180 lifted. The first and second conveyers 178 and 179 move back the top 10 such that the secondary transverse line 15 to be formed at another side of the top 10 is aligned with the guide bar 180.

Next, the guide bar 180 is move down to press the secondary transverse line 15 of the top 10, and the first conveyer 178 and the second conveyer 179 are rotated in opposite directions (the first conveyer 178 is rotated clockwise and the second conveyer 179 is rotated in the counterclockwise), whereby the top 10 is moved down and folded along the secondary transverse line 15. Accordingly, folding along the secondary transverse line 15 is finished.

The clothes item finished with folding along the secondary transverse line 15 can be discharged out of the case 110 by the unloading unit 190.

Figure 25:
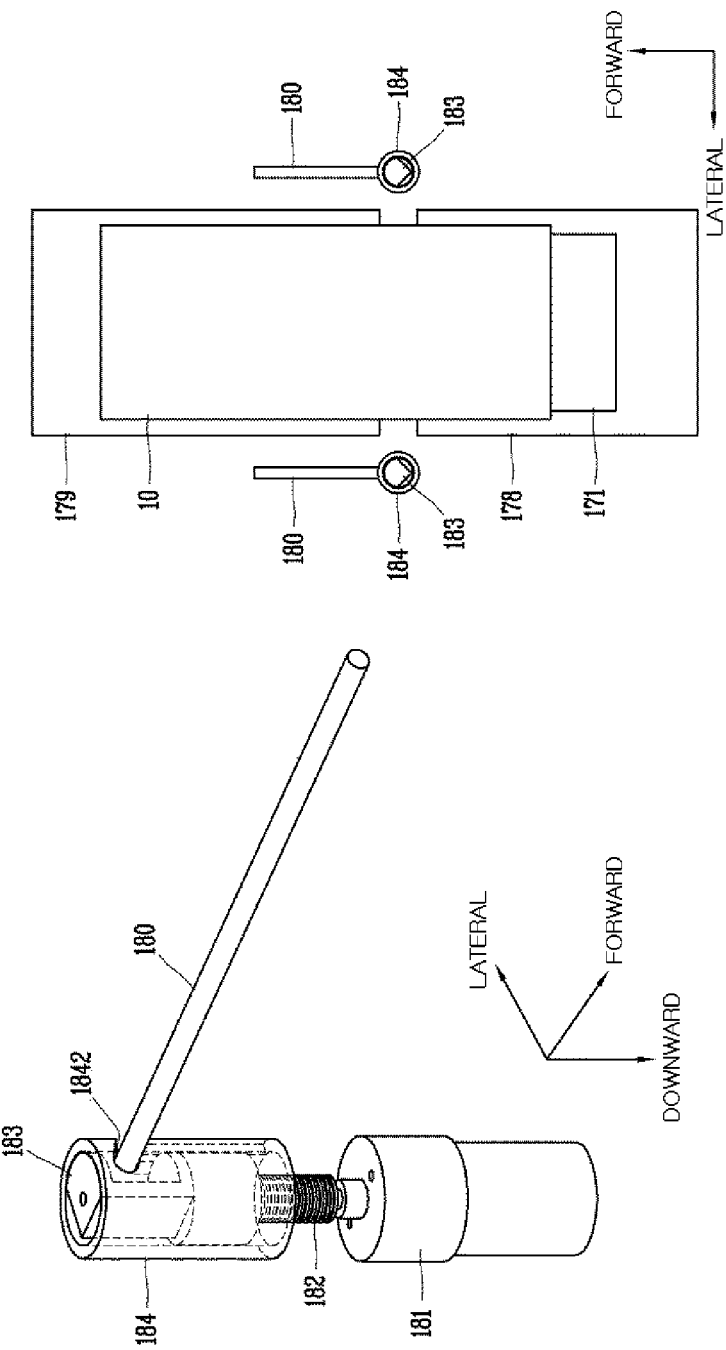
Figure 27:
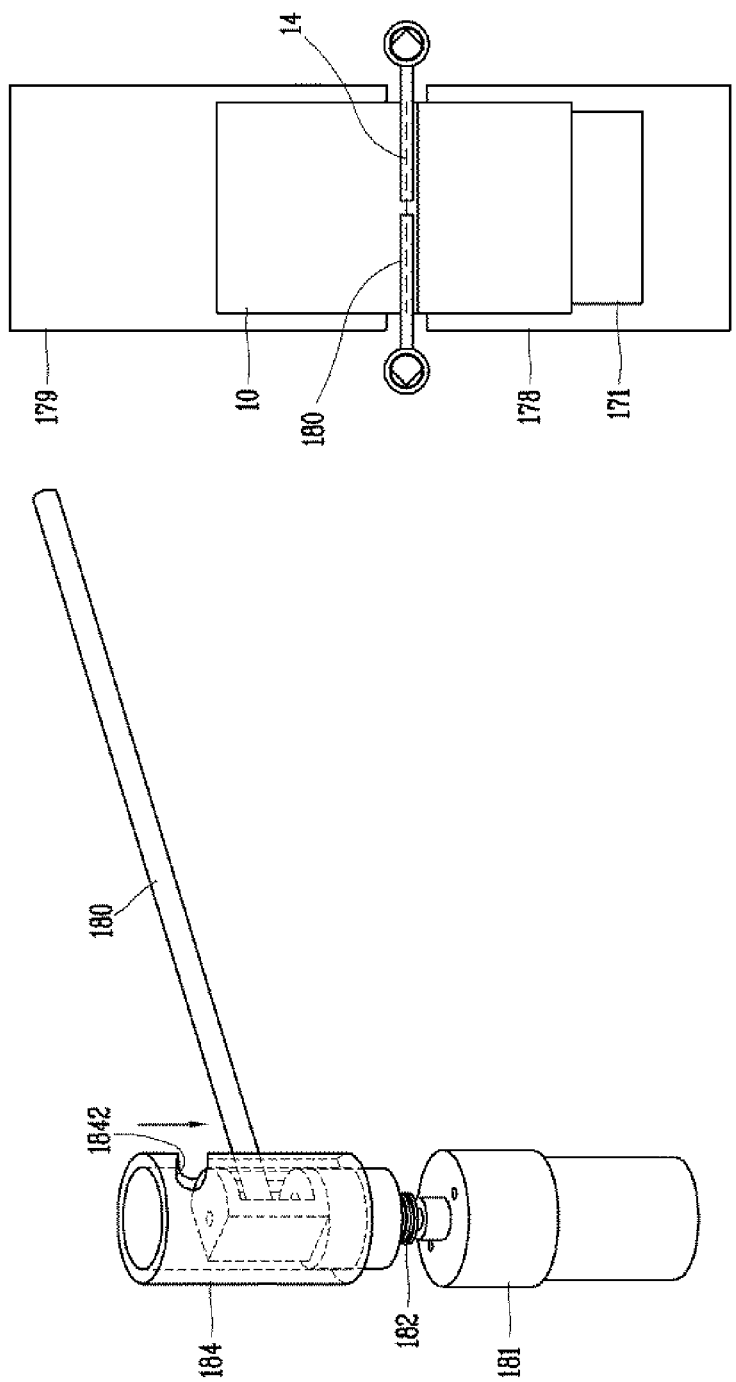
FIG. 27 is a conceptual view showing the guide bar moved down in FIG. 24.
Figure 28:
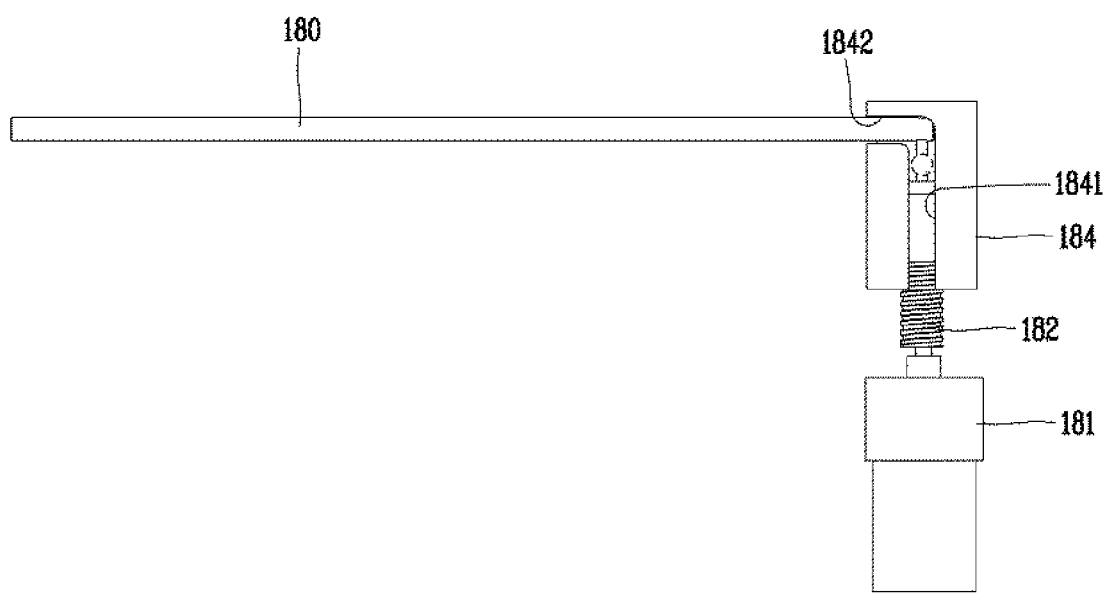
FIG. 28 is a conceptual view showing a guide hole that guides movement of the guide bar in FIG. 25.

FIG. 25 is a conceptual view showing the state in which the guide bar 180 is disposed to face the front in FIG. 24, FIG. 26 is a conceptual view showing the state in which the guide bar 180 is transversely disposed in FIG. 24, FIG. 27 is a conceptual view showing the guide bar 180 moved down in FIG. 24, and FIG. 28 is a conceptual view showing a guide hole 1841 and a rotation guide hole that guide movement of the guide bar 180 in FIG. 25.

In order to move the guide bar 180 in the up-down direction, a guide bar actuator includes a motor 181, a screw 182, a slider 183, and a housing 184.

The motor 181 is configured to drive the guide bar 180.

The screw 182 may be a lead screw. The screw 182 may be connected with the motor 181 through a shaft. The screw 182 may be vertically disposed in the up-down direction.

Male threads may be formed on the outer surface of the screw 182.

The slider 183 may be formed in a substantially cylindrical shape. Female threads may be formed on the outer surface of the slider 183. The slider 183 is thread-fastened to the screw 183 to move in the up-down direction when the screw 182 is rotated.

The guide bar 180 may protrude from the upper portion of the slider 183. The guide bar 180 may be mounted to be able to move up and down and rotate with the slider 183.

The housing 184 is configured to accommodate the slider 183. The slider 183 may be mounted to be able to move up and down and rotate in the housing 184.

A guide hole 1841 may be vertically formed at a side of the housing 184 in the up-down direction. The guide hole 1841 enables the guide bar 180 to protrude out of the housing 184. The guide hole 1841 may be disposed to face the gap 1790 between the first conveyer 178 and the second conveyer 179.

The guide bar 180 can move in the up-down direction along the guide hole 1841.

A rotation guide hole 1842 may be horizontally circumferentially formed at a side of the housing 184. The rotation guide hole 1942 may be circumferentially formed at the upper end of the guide hole 1841. The rotation guide hole 1842 may elongated 90 degrees in the circumferential direction of the housing 184.

The guide bar 180 can circumferentially rotate along the rotation guide hole 1842.

The length of the arc section of the rotation guide hole 1842 can limit the rotation angle of the guide bar 180 within 90 degrees. A first end of the rotation guide hole 1842 communicates with the guide hole 1841 and a second end of the rotation guide hole 1842 may be formed to face the front of the case 110.

According to this configuration, when a clothes item is conveyed forward by the first conveyer 178 and the second conveyer 179, the guide bar 180 may be disposed to open forward.

For folding along the primary transverse line 14, when the motor 181 is operated, the screw 182 can be rotated, the slider 183 can be laterally rotated from the front, and the guide bar 180 protruding from the upper portion of the slider 183 can be laterally rotated from the front along the rotation guide hole 1842 together with the slider 183.

Further, as the motor 181 is rotated forward for folding along the primary transverse line 14, the guide bar 180 moves down along the guide hole 1841, thereby being able to press the primary transverse line 14 of the top 10.

Next, the motor 181 is rotated backward, the guide bar 180 is moved up to the top surfaces of the first and second conveyers 178 and 179 along the guide hole 1841, and then the clothes item finished with folding along the primary transverse line 14 by the push board 171 can be moved rearward by the first conveyer 178 and the second conveyer 179.

Next, for folding along the secondary transverse line 15, when the motor 181 is rotated forward again, the guide bar 180 moves down along the guide hole 1841 and presses the secondary transverse line 15 and the first and second conveyers 178 and 179 receives the top 10, whereby folding along the secondary transverse line 15 is performed.

Figure 29:
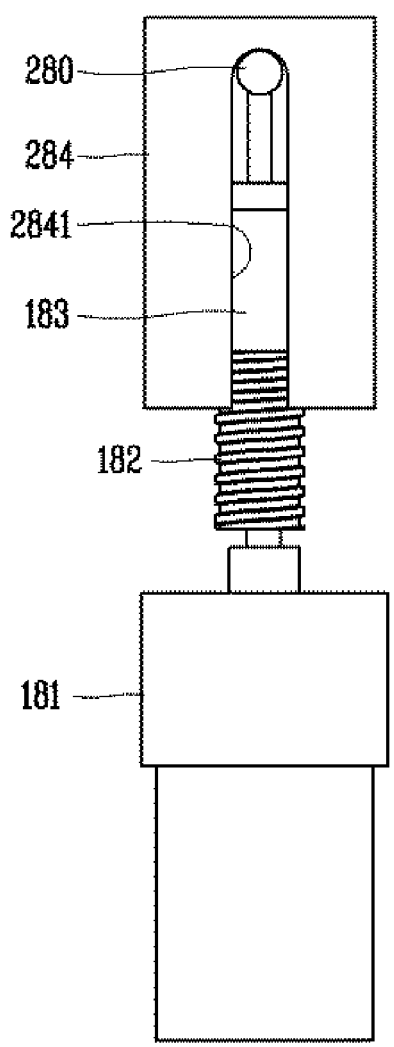
FIG. 29 is a conceptual view illustrating an up-down moving type operation structure of a guide bar according to another embodiment of the present disclosure.

FIG. 29 is a conceptual view illustrating an up-down moving type operation structure of a guide bar 280 according to another embodiment of the present disclosure.

This embodiment is different from the previous embodiment in that a housing 284 has only a guide hole 2841 formed in the up-down direction. In this embodiment, the rotation guide hole 1842 is not formed at the housing 284.

In this embodiment, the guide bar 280 is mounted to be able to move only in the up-down direction along the guide hole 2841.

The guide bar 280 is laterally elongated over the gap 1790 between the first conveyer 178 and the second conveyer 179 and can move only in the up-down direction.

When a top 10 is conveyed forward by the first and second conveyers 178 and 179, the guide bar 280 is positioned at the uppermost end of the guide hole 1841, so interference between the top 10 and the guide bar 280 can be avoid.

In folding along the primary transverse line 14, the guide bar 280 can move down to a predetermined first height H1 from the uppermost end of the guide hole 2841.

In folding along the secondary transverse line 15, the guide bar 280 can move down to a predetermined second height H2 from the uppermost end of the guide hole 2841.

Other components are the same as or similar to those of the previous embodiment, so repeated description is omitted.

Therefore, according to the present disclosure, the transverse-line folder 170 includes a plurality of conveyers 178 and 179. The push board 171 turns a top 10 over the primary transverse line while pushing the rear end of the top 10 by sliding in the front-rear direction over the conveyers 178 and 179 with the guide bar pressing and fixing the primary transverse line 14 to be formed at a side in the lateral direction of the top 10, whereby the top 10 can be folded along the primary transverse line 14 to overlap. Further, the conveyers 178 and 179 receive the secondary transverse line 15 to be formed at the upper side in the longitudinal direction of the top 10 into the gap 1790 formed between the conveyers 178 and 179, whereby the top 10 can be folded along the secondary transverse line 15 to overlap.

Accordingly, unlike the related art in which the height of folding machines is increased due to folding along transverse lines that is performed at different stages, the clothes folding machine 100 of the present disclosure completes folding along transverse lines at one stage, whereby the height of the clothes folding machine 100 can be considerably decreased, which can greatly contribute to downsizing of a product.

Further, since the push board 171 has a right-triangular cross-sectional shape, it easily pushes up the lower end of a top 10 horizontally placed on the top surfaces of the conveyers 178 and 179.

Further, since the guide bar 180 is installed to be able to move across the sliding direction of the push board 171 and presses the primary transverse line 14 or the secondary transverse line 15, folding along the primary transverse line 14 and the secondary transverse line 15 is easy and it is possible to minimize the path of clothes for transverse-line folding.

Further, since the push board 171 and the conveyers 178 and 19 press the primary transverse line 14 and the secondary transverse line 15 using one guide bar 180 when the push board 171 is operated for folding along the primary transverse line 14 and the conveyers 178 and 179 are operated for the secondary transverse line 15, the number of the guide bar 180 for pressing the primary transverse line 14 and the secondary transverse line 15 is reduced from 2 to 1, whereby it is possible to reduce the number of parts and the manufacturing cost.

Further, as another embodiment of the transverse-line folder 170, one conveyer 271 and one guide bar 274 are further disposed in series behind two conveyers 272 and 273 instead of the push board 171, folding along the primary transverse line 14 and folding along the secondary transverse line 15 can be completed at a single stage and the structure of the transverse-line folder 170 can be simplified.

Figure 30:
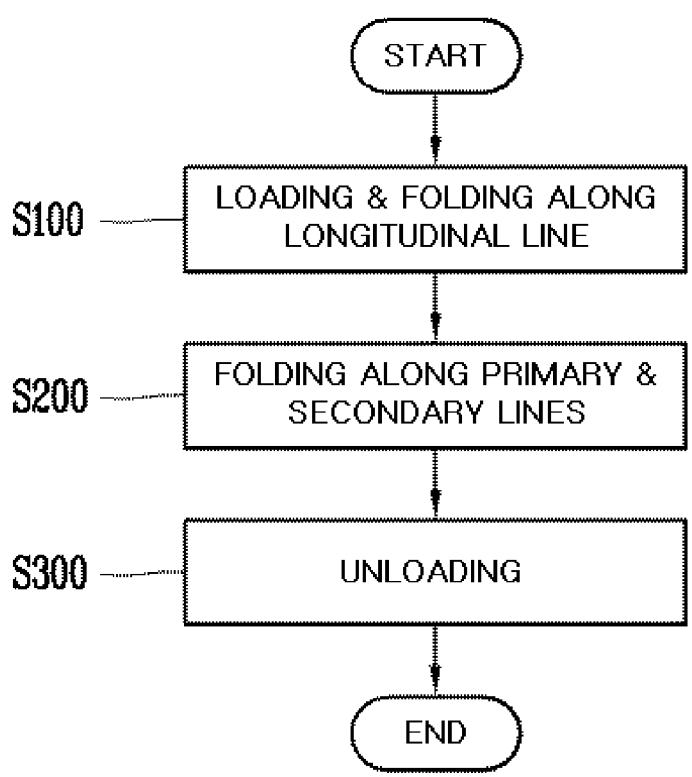
FIG. 30 is a flowchart illustrating a method of folding clothes according to the present disclosure.
Figure 31:
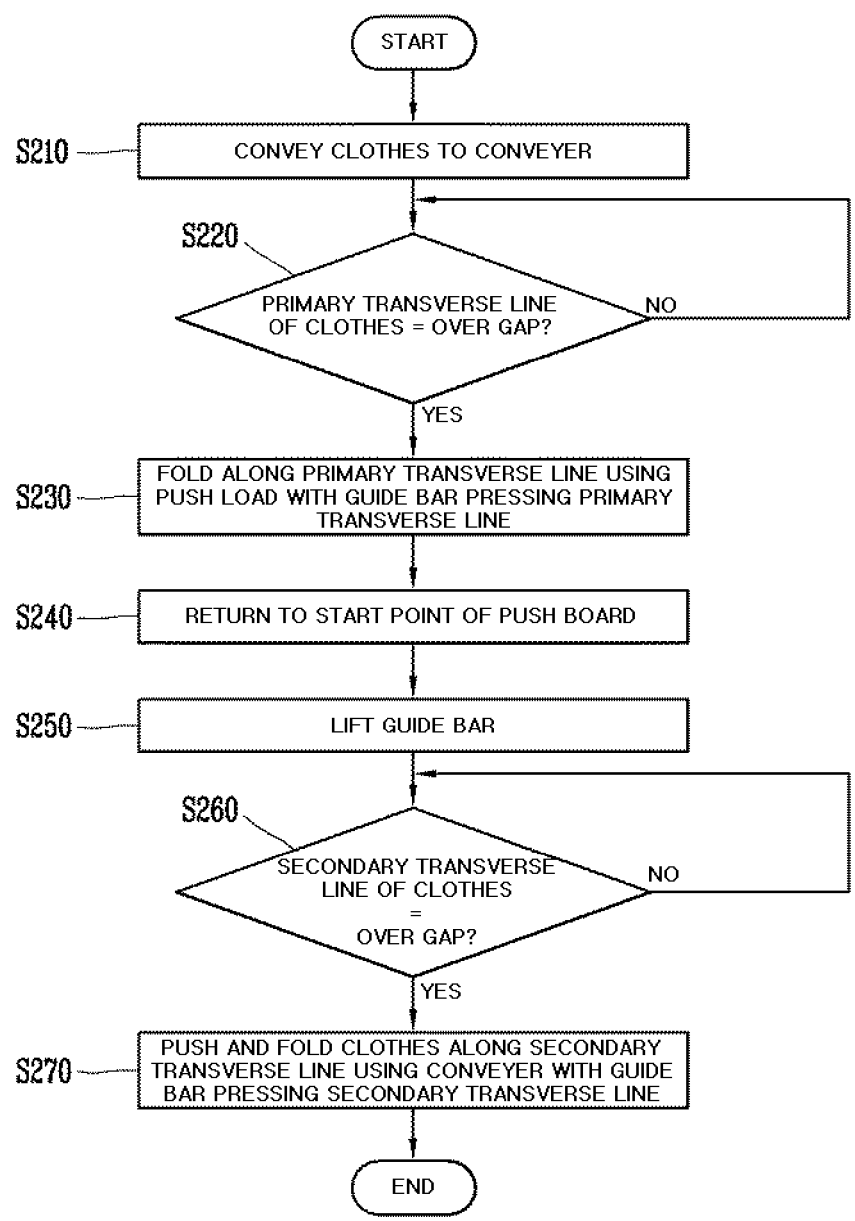
FIG. 31 is a flowchart illustrating a transverse-line folding method in FIG. 30.
Figure 32:
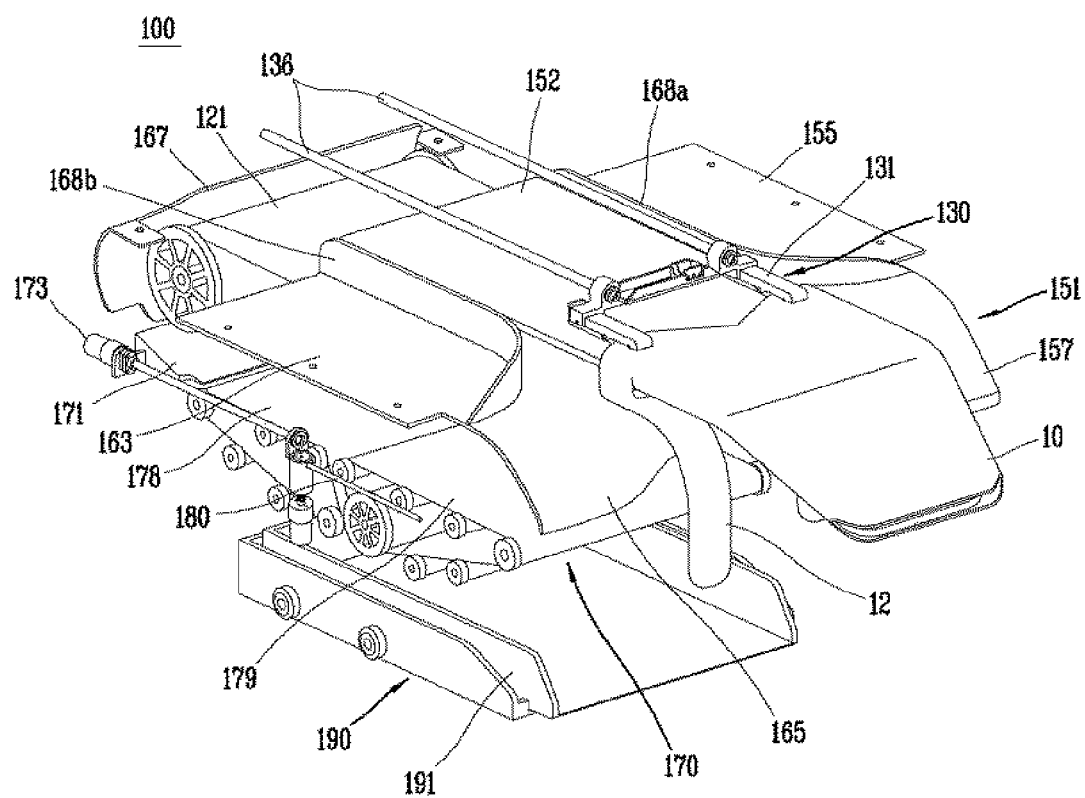
FIG. 32 is a conceptual view showing that a clothes item is loaded.
Figure 33:
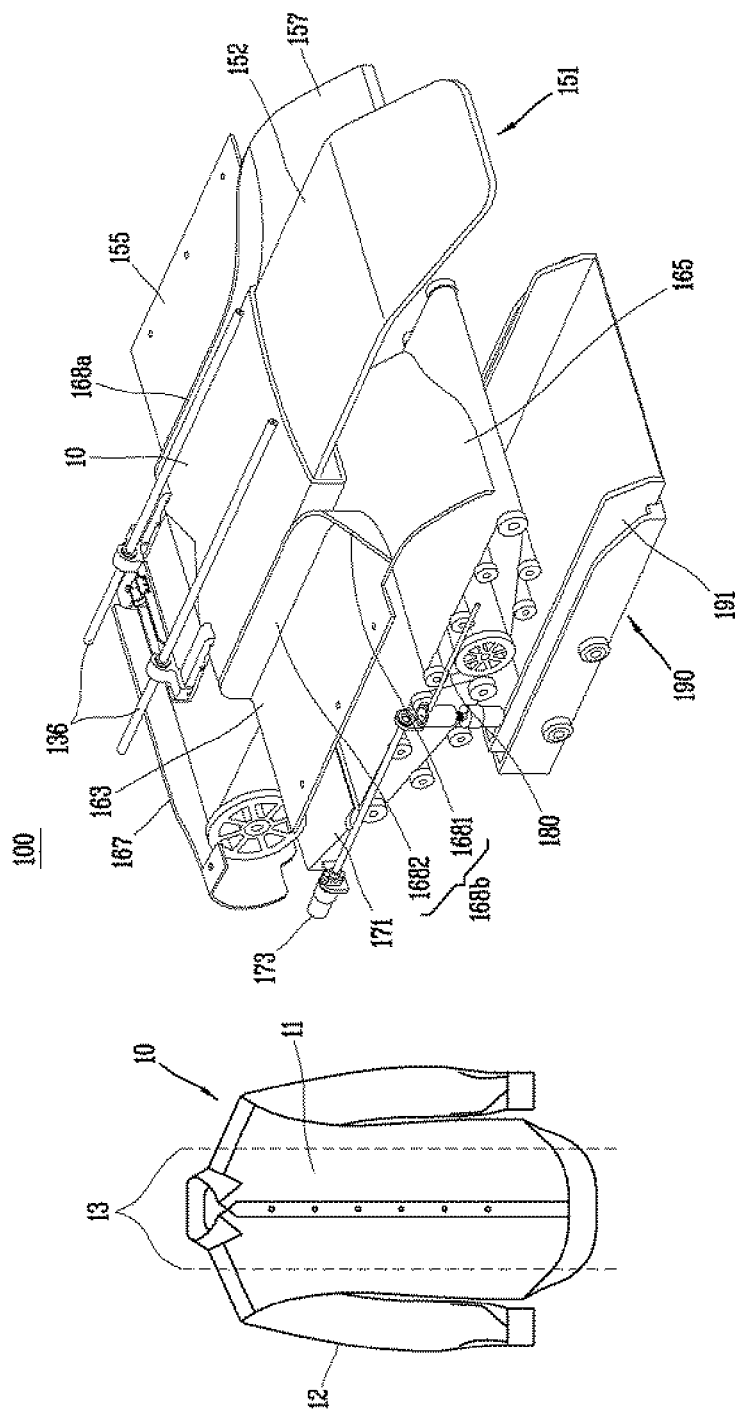
FIG. 33 is a conceptual view showing longitudinal-line folding of a clothes item.
Figure 34:
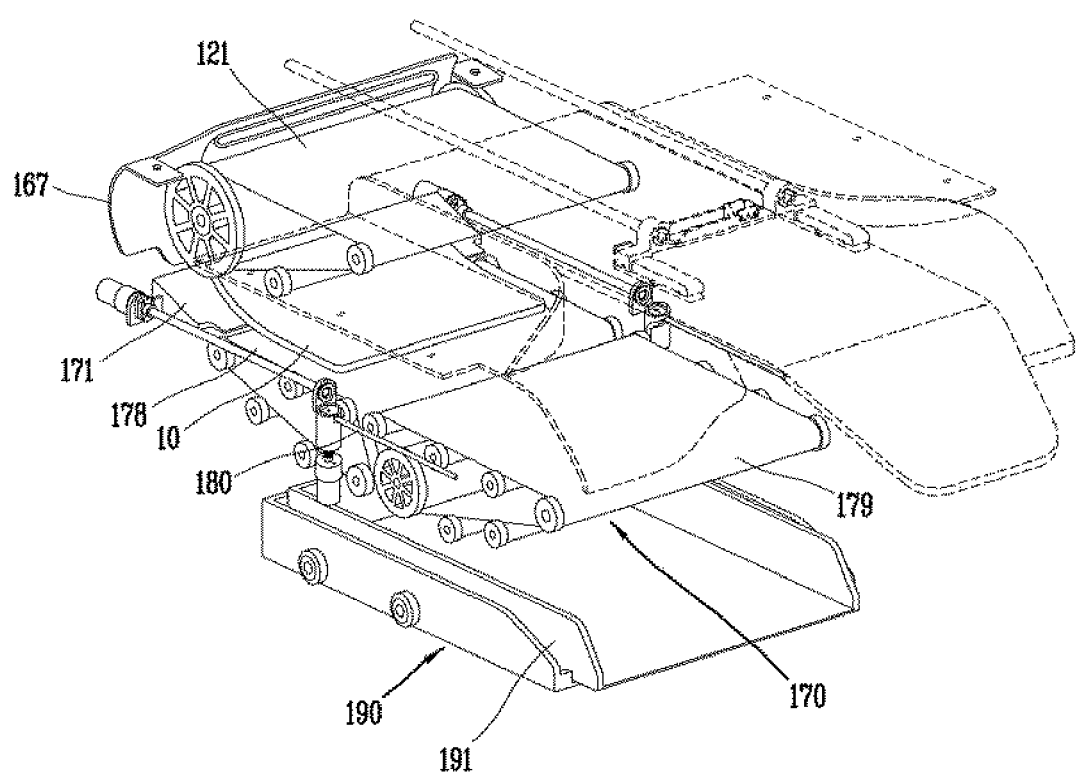
FIG. 34 is a conceptual view showing that a clothes item is conveyed to a transverse-line folder by a reverse guide.
Figure 36:
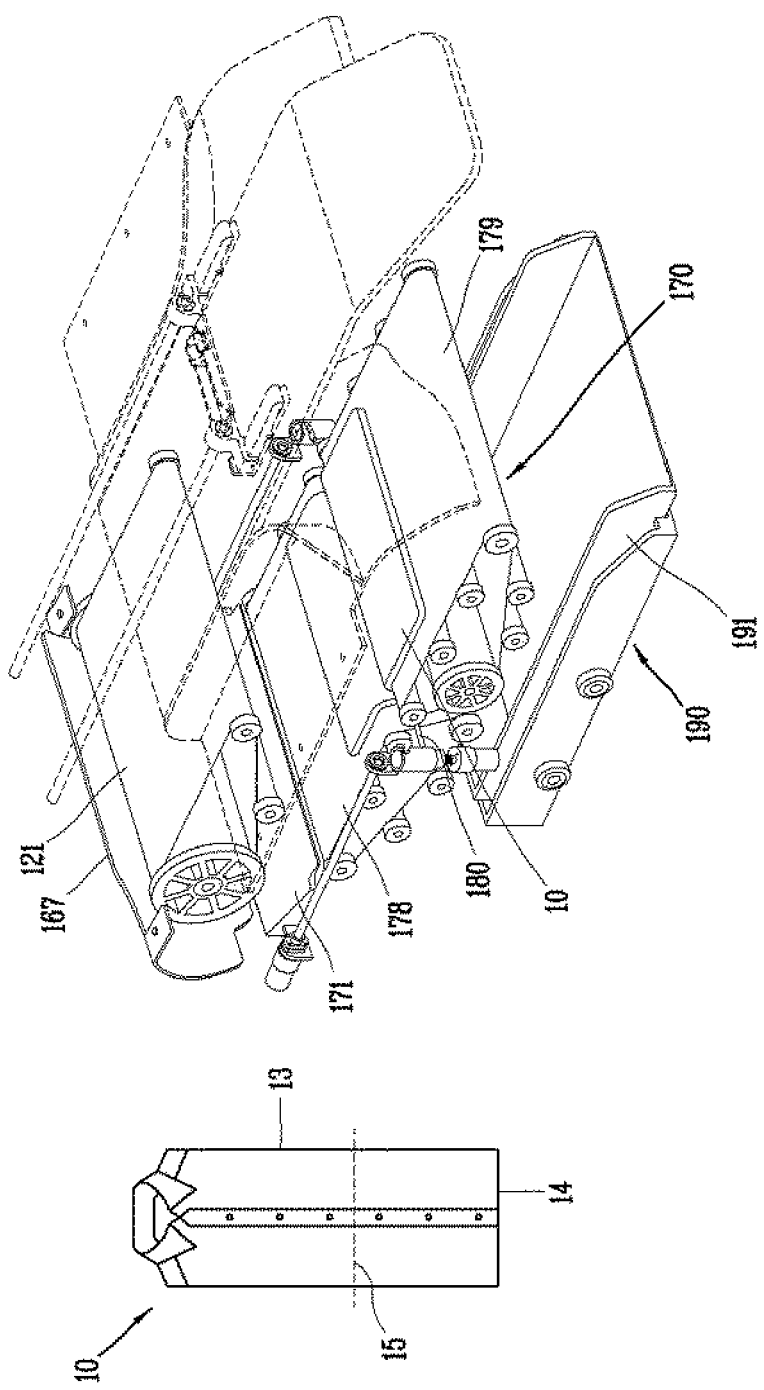
FIG. 36 is a conceptual view showing secondary transverse-line folding of a clothes item.
Figure 37:
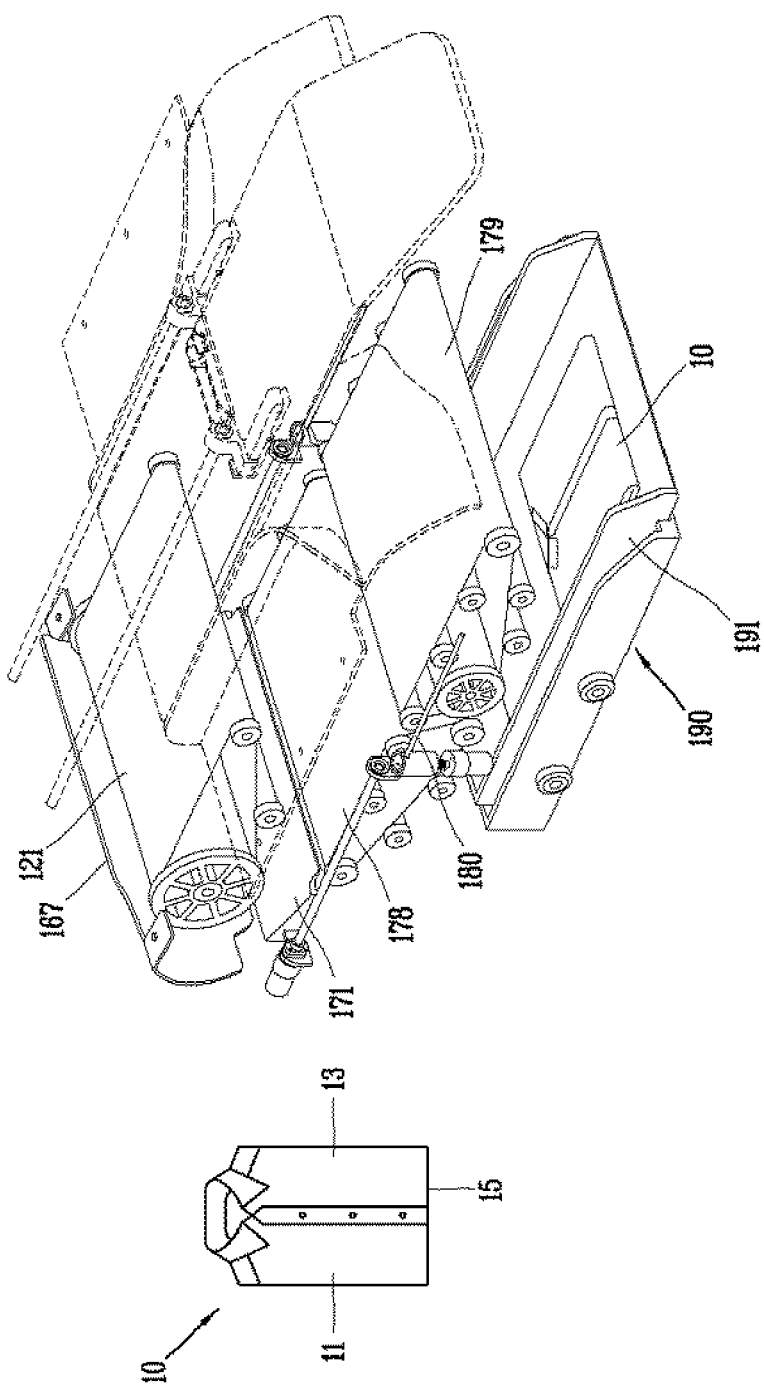
FIG. 37 is a conceptual view showing a clothes item conveyed to an unloading tray after folding is finished.

FIG. 30 is a flowchart illustrating a method of folding clothes according to the present disclosure, FIG. 31 is a flowchart illustrating a transverse-line folding method in FIG. 30, FIG. 32 is a conceptual view showing that a clothes item is loaded, FIG. 33 is a conceptual view showing longitudinal-line folding of a clothes item, FIG. 34 is a conceptual view showing that a clothes item is conveyed to the transverse-line folder 170 by the reverse guide 167, FIG. 35 is a conceptual view showing folding along the primary transverse line 14 of a clothes item, FIG. 36 is a conceptual view showing folding along the secondary transverse line 15 of a clothes item, and FIG. 37 is a conceptual view showing a clothes item conveyed to the unloading tray 191 after folding is finished.

Hereafter, a method of folding clothes of the present disclosure is described.

The loading unit 130 and the longitudinal-line folder 151 disposed at the upper stage can fold a top 10 along the longitudinal lines 13 simultaneously with loading of the clothes item (S100).

The transverse-line folder 170 disposed at the middle stage 122 can complete folding along the primary transverse line 14 and folding along the secondary transverse line 15 of the top 10 folded along the longitudinal lines 13.

The unloading unit 190 disposed at the lower stage 123 can unload the top 10 folded along the longitudinal lines 13 and the transverse lines 14 and 15 (S300).

This configuration is described in more detail.

A user may hang a top 10 such that the sounder lines are gripped by the grippers 131 of the clothes folding machine 100.

The loading unit 130 conveys the top 10 gripped by the grippers 131 inward from the front of the case 110. When the top 10 is conveyed (loaded), the body part 11 is supported by the main board 152 and both sides of the body part 11 and both sleeves 12 of the top 10 hang down in the gravity direction from both side edges of the main board 152.

The longitudinal-line folder 151 folds the top along the longitudinal lines 13 simultaneously with loading of the top 10. Since the grippers 131 are moved with the bottom surfaces maintaining a minimum gap (within 2 mm) from the conveying guides 154 at both side edges of the main board 152, the height difference between the shoulder lines of the top and the both part 11 of the top 10 placed on the main board 152.

The main board 152 supports the body part 11 of the top 10 such that the body part 11 can slide from the front to the rear of the case 110. Both side edges of the main board 152 can form the longitudinal lines 13 longitudinally extending from both shoulder lines of the top 10.

Since the main board 152 is curved such that the center portion is convex further than both side edges, there is an effect of straightening the body part 11 of the top 10.

Since the sub-board 155 and 163 are horizontally disposed at both sides of the main board 152 with different height differences with respect to the main board 152, thereby being able to form passages for both sleeves 12 hanging down from both side edges of the main board 152 in cooperation with the main board 152.

When the top 10 passes the main board 152 and the sub-board 155 and 163, both sleeves 12 are laterally folded along the longitudinal lines 13.

The top 10 finished with folding along the longitudinal lines 13 is conveyed toward the reverse guide 167 by the upper conveyer 121. The reverse guide 167 presses the release protrusions 135 formed at the rear ends of the grippers 131, whereby the top 10 is released from the grippers 131.

The reverse guide 167 delivers the top 10 to the first conveyer 178 of the transverse-line folder 170 that is the middle conveyer from the upper conveyer 121. While the top 10 is conveyed along the reverse guide 167, the top surface (front) and the bottom surface (back) of the top 10 are switched and the conveying direction is changed in the opposite direction.

That is, the front of the top 10 faces up on the upper conveyer 121 and then faces down on the middle conveyer (the first conveyer 178 and the second conveyer 179) after passing the reverse conveyer 167. The neck part of the top 10 is conveyed rearward from the front on the upper conveyer 121 and then conveyed forward from the rear on the middle conveyer.

Referring to FIG. 31, the transverse-line folder 170 completes folding the top 10 along the primary and secondary transverse lines 15.

The top 10 finished with folding along the longitudinal lines 13 is sent to the upper portion of the first conveyer 178 through the push board 171 from the reverse guide 167. In this process, the rear end of the clothes item may be disposed to overlap at least a portion of the top surface of the push board 171 in the up-down direction.

The first conveyer 178 and the second conveyer 179 convey the top 10 from the rear to the front by rotating in the same direction (S210). A first side in the longitudinal direction of the top 10 is placed on the top surface of the first conveyer 178 and a second side in the longitudinal direction of the top 10 is placed on the top surface of the second conveyer 179.

The primary transverse line 14 to be formed at the first side in the longitudinal direction of the top 10 is disposed over the gap 1790 between the first conveyer 178 and the second conveyer 179 to overlap each other in the up-down direction (S220).

The guide bar 180 is placed over the primary transverse line 14 by laterally rotating from the front.

The guide bar 180 is mounted in the housing 184 to be movable downward, so it presses the primary transverse line 14 while moving down along the guide hole 1841.

The push board 171 that is the folder for the primary transverse line 14 is disposed over the first conveyer 178 to be movable in the front-rear direction. When the push board 171 is moved forward, the front end of the push board 171 moves forward while pushing up the lower portion (rear end) of the top 10 with the inclined top surface thereof.

The upper portion of the primary transverse line 14 of the top 10 is pressed and fixed by the guide bar 180 and the front end of the push board 171 pushes forward and turns the first side of the top 10 over the primary transverse line 14 while passing the guide bar 180, thereby folding the top 10 along the primary transverse line 14 to overlap (S230).

The push board 171 is moved rearward to the initial position (S240). The guide bar 180 is moved up in the transversely horizontally elongated state (S2500.

The first conveyer 178 and the second conveyer 179 are rotated in the same direction, thereby conveying the top 10 finished with folding along the primary transverse line 14 rearward.

The secondary transverse line 15 to be formed at the second side in the longitudinal direction of the top 10 is conveyed over the gap 1790 between the first conveyer 178 and the second conveyer 179 to overlap each other in the up-down direction (S260).

The guide bar 180 moves down again and presses the secondary transverse line 15.

The first conveyer 178 and the second conveyer 179 are rotated in opposite direction. The first conveyer 178 puts the lower portion of the top 10 folded in two layers through folding along the primary transverse line 14 into the lower portion of the gap 1790 with the guide bar 180 pressing the secondary transverse line 15, and the second conveyer 179 puts the upper portion of the top 10 into the lower portion of the gap 1790.

The first side of the top 10 which is folded in two layers and the second side of the top 10 which is one layer with respect to the secondary transverse line 15 are simultaneously pushed into the gap 1790 between the first conveyer 178 and the second conveyer 179, whereby they are folded in three layers. As a result, folding along the secondary line 15 is finished (S270).

Next, the top 10 finished with folding along the secondary line 15 is discharged to the unloading unit 190 from the gap 1790. The unloading unit 190 unloads folded clothes out of the case 110.

The top 10 discharged out of the cap 1790 is placed in the unloading tray 191 and conveyed out of the case 110 by the lower conveyer 192 of the unloading unit 190 (S300).

Figure 38:
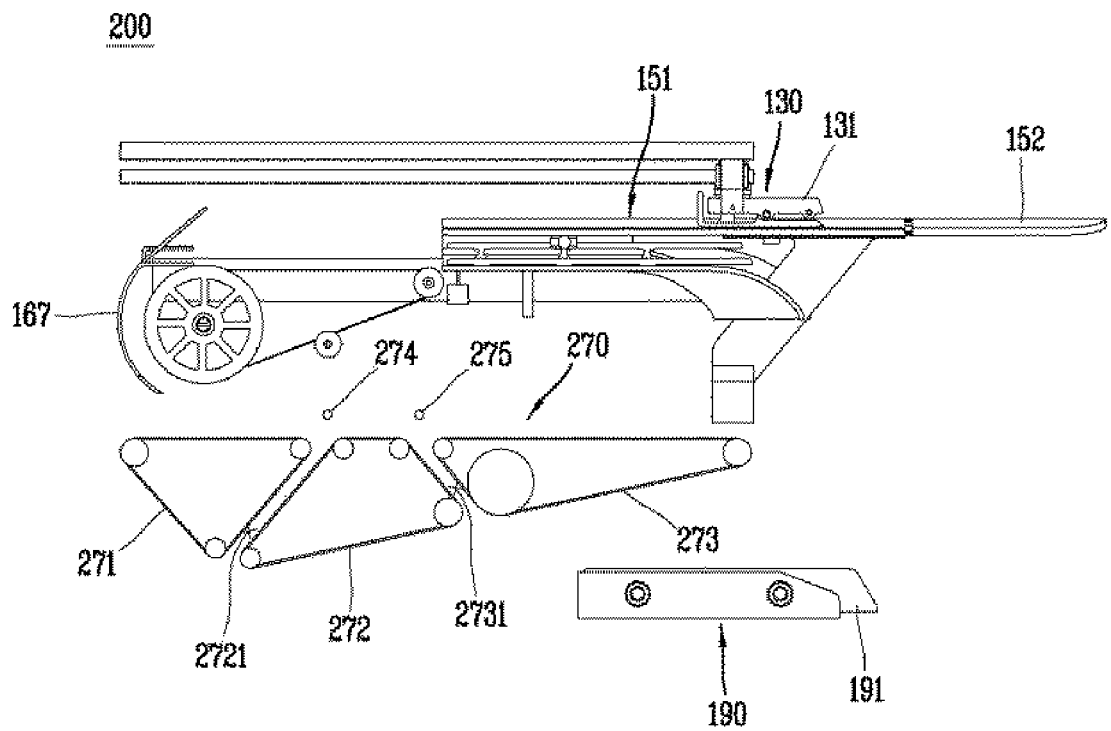
FIG. 38 is a conceptual view showing another embodiment of a transverse-line folder for transverse-line folding of the present disclosure.
Figure 39:
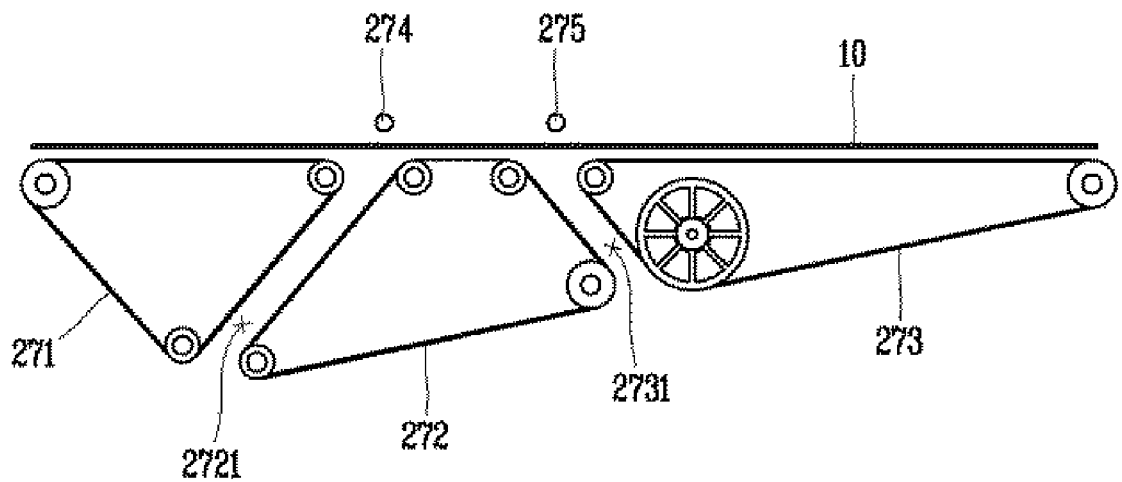
FIG. 39 is a conceptual view showing a clothes item conveyed to first to third conveyers for transverse-line folding after longitudinal-line folding is finished.
Figure 40:
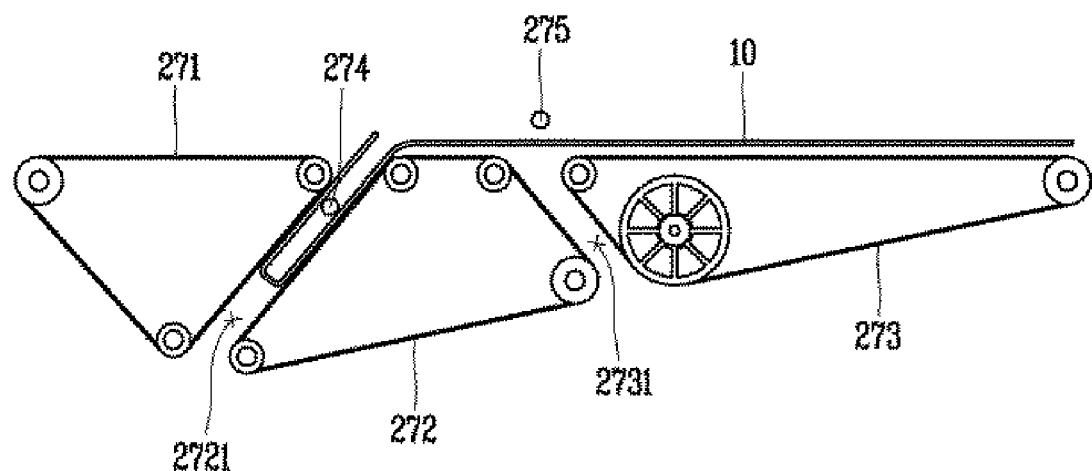
FIG. 40 is a conceptual view illustrating primary transverse-line folding.
Figure 41:
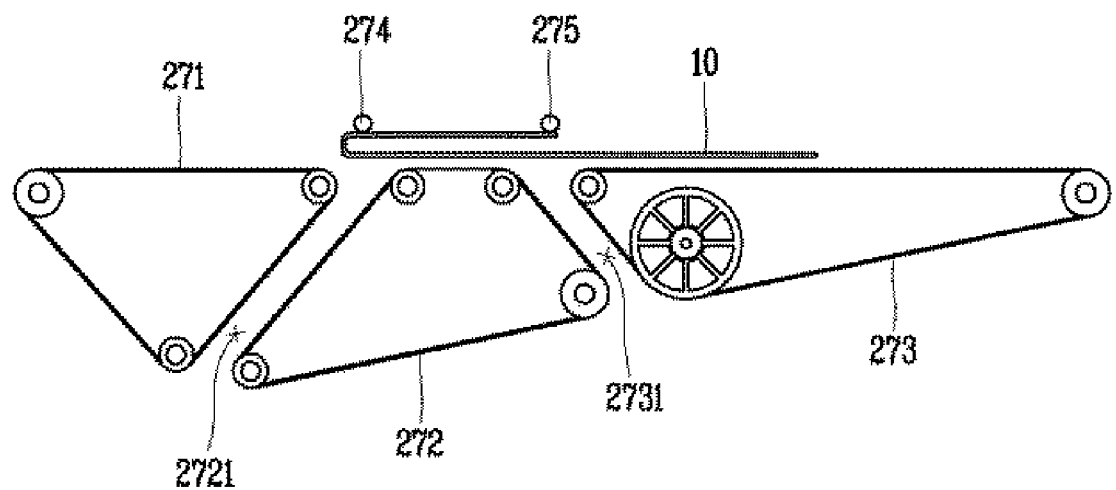
FIG. 41 is a conceptual view showing the state in which a clothes item finished with primary transverse-line folding has been conveyed to the third conveyer.
Figure 42:
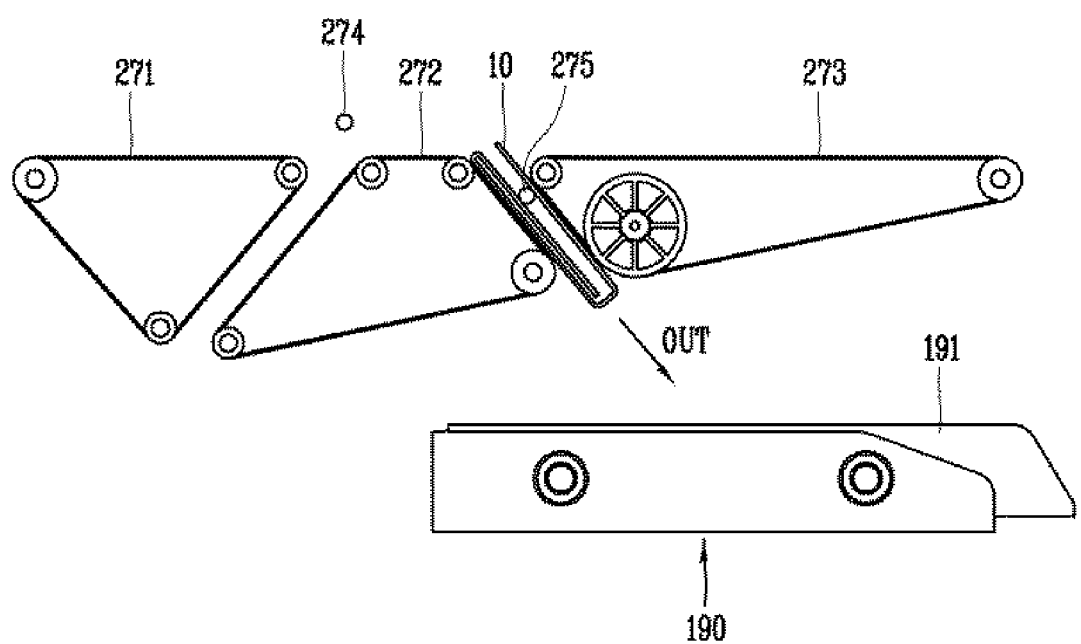
FIG. 42 is a conceptual view showing secondary transverse-line folding and the state in which a clothes item finished with transverse-line folding is taken out.

FIG. 38 is a conceptual view showing another embodiment of the transverse-line folder 270 for transverse-line folding of the present disclosure, FIG. 39 is a conceptual view showing a clothes item conveyed to the first conveyer 271 to the third conveyer 273 for transverse-line folding after folded along the longitudinal lines 13, FIG. 40 is a conceptual view illustrating folding along the primary transverse line 14, FIG. 41 is a conceptual view showing the state in which a clothes item finished with folding along the primary transverse line 14 has been conveyed to the third conveyer 273, and FIG. 42 is a conceptual view showing folding along the secondary transverse line 15 and the state in which a clothes item finished with folding along the transverse line 15 is taken out.

This embodiment is different from the previous embodiments in that transverse-line folding is performed by three conveyers 271, 272, and 273 and two guide bars 274 and 275.

In this embodiment, the primary transverse-line folder includes a first conveyer 271 and a first guide bar 274. In this embodiment, the secondary transverse-line folder includes a third conveyer 273 and a second guide bar 275. The primary transverse-line folder and the secondary transverse-line folder may share the second conveyer 272.

The conveyers 271, 272, and 273 for transverse-line folding may be disposed in series in the front-rear direction at the middle stage 122 of the case 110. The conveyers 271, 272, and 273 are configured to convey clothes to the middle conveyer. The conveyers 271, 272, and 273 may be configured to perform folding along the primary transverse line 14 and the secondary transverse line 15.

The conveyers 271, 272, and 273 may be composed of first to third conveyers 271, 272, and 273.

The first conveyer 271 is disposed at the rear of the case 110, the second conveyer 272 is disposed ahead of the first conveyer 217 with a first gap 2721 therebetween, and the third conveyer 273 is disposed ahead of the second conveyer 279 with a second gap 2731 therebetween.

The conveyers 271, 272, and 273 may be composed of a plurality of rollers and a belt.

The rollers may be formed in a cylindrical shape and may be disposed at the three apexes of an inverse triangle. The conveyer belt may be configured to surround and connect the rollers.

The first conveyer 271 and the third conveyer 273 each may be configured in an inverse triangular shape. The first conveyer 271 and the third conveyer 273 each may be different in size. The second conveyer 272 may be configured in a trapezoidal shape.

The front end portion of the first conveyer 271 and the rear end portion of the second conveyer 272 each may be formed to be inclined downward rearward from the front end of the of the first conveyer 271 while maintaining the predetermined first gap 2721.

The front end portion of the second conveyer 272 and the rear end portion of the third conveyer 273 each may be formed to be inclined downward forward from the rear end of the of the third conveyer 273 while maintaining the predetermined second gap 2731.

The top surfaces of the first conveyer 271 to the third conveyer 273 are disposed in the same plane. The top surface of the second conveyer 272 may be horizontally elongated slightly shorter than the distance between the primary transverse line 14 and the secondary transverse line 15.

The first gap 2721 and the second gap 2731 may be inclined rearward and forward in opposite directions.

The guide bars 274 and 275 may be a first guide bar 274 and a second guide bar 275.

The first guide bar 274 may be disposed over the first gap 2721 and the second guide bar 275 may be disposed over the second gap 2731. The first guide bar 274 and the second guide bar 275 may be spaced apart from each other by the gap between the primary transverse line 14 and the secondary transverse line 15.

The first guide bar 274 and the second guide bar 275 may be mounted to be movable in the up-down direction or at an angle along the gaps 2721 and 2731. In this embodiment, the first and second guide bars 274 and 275 are mounted to be movable in the up-down direction.

The first guide bar 274 and the second guide bar 275 each may be elongated between two conveyers adjacent to each other in the front-rear direction, and may be disposed higher than the top surfaces of the conveyers.

Hereafter, a method of folding clothes of the present disclosure is described.

A top 10 finished with folding along the longitudinal lines 13 is conveyed to the first conveyer 271 along the reverse guide 167.

The first conveyer 271 to the third conveyer 273 convey the top 10 from the rear to the front by rotating in the same direction. The primary transverse line 14 to be formed at the longitudinal lower portion of the top 10 is disposed under the first guide bar 274 and the secondary transverse line 15 to be formed at the longitudinal upper portion of the top 10 is disposed under the second guide bar 275.

The guide bar 274 moves down and presses the primary transverse line 14.

Next, the first conveyer 271 and the second conveyer 272 are rotated in opposite directions, thereby putting the lower portion and the upper portion of the top 10 with respect to the primary transverse line 14 to the rear lower portion from the front end of the first conveyer 271 along the first gap 2721. The upper portion and the lower portion of the top 10 are folded to overlap in two layers, whereby folding along the primary transverse line 14 is finished.

Next, the first guide bar 274 is moved up to the initial position and comes out of the top 10 finished with folding along the primary transverse line 14.

Thereafter, the first conveyer 271 and the second conveyer 272 are rotated in opposite directions, thereby discharging the top 10 finished with folding along the primary transverse line 14 to the top surface of the second conveyer 272 from the first gap 2721.

Next, the second conveyer 272 and the third conveyer 273 are rotated in the same direction, whereby the top 10 is conveyed such that the secondary transverse line 15 is positioned under the second guide bar 275.

Further, the guide bar 275 moves down and presses the secondary transverse line 15.

Next, the second conveyer 272 and the third conveyer 273 are rotated in opposite direction, thereby putting the lower portion of the top 10 which is folded in two layer and the upper portion that is a one layer of the top 10 with respect to the secondary transverse line 15 to the front rear portion from the rear end of the third conveyer 273 along the second gap 2731. The upper portion and the lower portion of the top 10 are folded to overlap in three layers, whereby folding along the secondary transverse line 15 is finished.

Next, the second guide bar 180 is returned up to the initial position from the inside of the top 10 finished with folding along the secondary transverse line 15.

Next, the second conveyer 272 and the third conveyer 273 are rotated in opposite directions, whereby discharging downward the top 10 finished with folding along the secondary folding line 15 to the front from the second gap 2731.

Finally, the top 10 finished with folding along the secondary transverse line 15 is discharged out of the case 110 by the unloading unit 190.

Those skilled in the art would understand that the technical configuration of the present disclosure may be implemented in various ways without changing the necessary features or the spirit of the prevent disclosure.

Therefore, it should be understood that the embodiment described above is not limitative, but only an example in all respects, the scope of the present disclosure is expressed by claims described below, not the detailed description, and it should be construed that all of changes and modifications achieved from the meanings and scope of claims and equivalent concept are included in the scope of the present disclosure.

The invention claimed is:

1. A clothes folding machine comprising:
   a case;
   a loading unit having a plurality of grippers, the loading unit being disposed at an upper portion of the case and configured to convey a clothes item gripped by the plurality of grippers into the case;
   a folding unit including (i) a longitudinal-line folder that folds both sleeves of the clothes item conveyed by the loading unit along longitudinal lines and (ii) a transverse-line folder that folds the clothes item along transverse lines several times; and
   an unloading unit disposed at a lower portion of the case and configured to convey the clothes item folded by the folding unit out of the case,
   wherein the transverse-line folder is disposed at a single stage at a downstream side of a path of the clothes item,
   wherein the transverse-line folder includes:
      a push board that is configured to slide in a front-rear direction of the case at a start point of movement of the clothes item at the downstream side and that is configured to fold the clothes item along a primary transverse line formed at a first longitudinal portion of the clothes item by pushing up a lower end of the clothes item forward over the primary transverse line, and
      a plurality of conveyers spaced apart from each other with a predetermined gap therebetween in the front-rear direction under the push board, the plurality of conveyers being configured to fold the clothes item along a secondary transverse line formed at a second longitudinal portion of the clothes item by putting the clothes item into the gap, and
   wherein the push board has a triangular cross-section and is elongated in a lateral direction of the case.

2. The clothes folding machine of claim 1, further comprising a guide bar elongated in a transverse direction of the clothes item ahead of the push board, the guide bar being configured to move in a direction crossing a sliding direction of the clothes item over the gap and configured to press the primary transverse line or the secondary transverse line of the clothes item.

3. The clothes folding machine of claim 2, wherein:
   the push board and the conveyers share the guide bar,
   the push board is configured to fold the clothes item along the primary transverse line by moving forward with respect to the conveyers and pushing a rear end of the clothes item forward with the guide bar moving down from over the gap and pressing down the primary transverse line of the clothes item,
   the push board is configured to be moved rearward with the guide bar moved up over the gap, and
   the conveyers are rotated in opposite direction to put the clothes item into the gap with the guide bar further moving down in the gap and pressing down the secondary transverse line of the clothes item, whereby the clothes item is folded along the secondary transverse line.

4. The clothes folding machine of claim 2, wherein the conveyers include:
   a first conveyer disposed to face a front at the start point at the downstream side; and
   a second conveyer disposed ahead the first conveyer with the gap therebetween, and
   wherein a front end of the first conveyer and a rear end of the second conveyer are inclined downward forward and maintain the predetermined gap therebetween.

5. The clothes folding machine of claim 2, wherein the guide bar is mounted to be able to move in an up-down direction or at an angle in the gap.

6. The clothes folding machine of claim 2, wherein the guide bar is one of a plurality of guide bars that are disposed at sides of the case, respectively, and the sides of the case are spaced apart from each other in a transverse direction of the case, and
   wherein each of the plurality of guide bars is configured to rotate horizontally about a rotary shaft that is vertically disposed such that the plurality of guide bars (i) are disposed in parallel with each other and oriented toward a front side of the case into which the clothes item is put in, or (ii) are disposed to face each other in the transverse direction.

7. The clothes folding machine of claim 2, further comprising:
   a motor configured to drive the guide bar;
   a screw connected with the motor;
   a slider from which the guide bar protrudes in one direction and that is thread-fastened to the screw to slide in an up-down direction; and
   a housing that accommodates the slider such that the slider slides in the up-down direction, the housing having a guide hole through which the guide bar protrudes from the slider, wherein the guide hole guides an up-down movement of the guide bar.

8. The clothes folding machine of claim 7, wherein the housing further includes a rotation guide hole circumferentially formed at an upper end of the guide hole and guiding rotation of the guide bar.

9. The clothes folding machine of claim 1, further comprising:

a motor driving the push board;
a connecting portion laterally protruding from a side of the push board;
a plurality of pulleys connected with the motor through a shaft and spaced apart from each other in a sliding direction of the clothes item; and
a belt connecting the pulleys, connected with the connection portion at a side, and transmitting power of the motor to the push board.

10. The clothes folding machine of claim 1, further comprising:
a motor driving the push board;
a connecting portion laterally protruding from a side of the push board;
a ball screw connected with the motor to rotate; and
a front-rear moving member fastened to the connecting portion, thread-fastened to the ball screw, and mounted to be movable in the front-rear direction when the ball screw is rotated.

11. A method of folding clothes using a clothes folding machine that includes a push board disposed in a case and configured to slide in a front-rear direction of the case at a start point of movement of a clothes item at a downstream side of a path of the clothes item, a plurality of conveyers spaced apart from each other with a predetermined gap therebetween in the front-rear direction under the push board, and a guide bar disposed over the gap and configured to move up and down in the gap, the method comprising:
conveying, by the conveyers, the clothes item toward a front of the case such that a primary transverse line of the clothes item for folding a first portion of the clothes item is positioned over the gap;
moving the guide bar down from a position over the gap and pressing the clothes item by the guide bar;
folding, by the push board, the clothes item along the primary transverse line to overlap by moving the push board toward the front of the case from the start point and pushing and turning over a lower end of the first portion of the clothes item ahead of the primary transverse line;
returning the push board to the start point;
moving the guide bar over the gap;
conveying, by the conveyers, the clothes item toward the front of the case such that a secondary transverse line of the clothes item for folding a second portion of the clothes item is positioned over the gap;
moving the guide bar into the gap and pressing the secondary transverse line by the guide bar; and
folding, by the conveyers, the second portion of the clothes item along the secondary transverse line to overlap by putting the secondary transverse line into the gap.

12. The method of claim 11, wherein the push board, the guide bar, and the conveyers are disposed at a single stage at the downstream side.

13. The method of claim 11, wherein the push board has a triangular cross-section, and
wherein, before the push board is moved to the front of the case, the clothes item is in an overlapping state in which the clothes item overlaps with at least a portion of a top surface of the push board in an up-down direction, and
wherein the method further comprises conveying the clothes item toward the front of the case from the start point in the overlapping state.

14. The method of claim 11, further comprising:
folding the clothes item along longitudinal lines of the clothes item for simultaneously folding both sleeves of the clothes item to overlap at an upstream side of the path of the clothes item simultaneously with loading of the clothes item before being folded along the primary transverse line.

15. The method of claim 11, further comprising unloading the clothes item to the front of the case after the clothes item is folded along the secondary transverse line.

16. A clothes folding machine comprising:
a case;
a loading unit having a plurality of grippers, the loading unit being disposed at an upper portion of the case and configured to convey a clothes item gripped by the grippers into the case;
a folding unit including (i) a longitudinal-line folder that folds both sleeves of the clothes item conveyed by the loading unit along longitudinal lines and (ii) a transverse-line folder that folds the clothes item along transverse lines several times; and
an unloading unit disposed at a lower portion of the case and configured to convey the clothes item folded by the folding unit out of the case,
wherein the transverse-line folder includes:
a plurality of conveyers that are disposed at a single stage at a downstream side in a path of the clothes item, the plurality of conveyers including three or more components in a series with predetermined gaps therebetween in a front-rear direction of the case, wherein the plurality of conveyers are configured to (i) fold the clothes item along a primary transverse line formed at a first longitudinal portion of the clothes item by putting the clothes item into a first gap spaced toward a front of the case from a start point of movement of the clothes item and (ii) fold the clothes item along a secondary transverse line formed at a second lateral portion of the clothes item by putting the clothes item into a second gap spaced toward the front from the first gap, and
a plurality of guide bars configured to move up and down and insert into the first gap and the second gap, respectively, the plurality of guide bars being configured to press the primary transverse line and the secondary transverse line, respectively,
wherein the plurality of guide bars are disposed at sides of the case, respectively, and the sides of the case are spaced apart from each other in a transverse direction of the case, and
wherein each of the plurality of guide bars is configured to rotate horizontally about a rotary shaft that is vertically disposed such that the plurality of guide bars (i) are disposed in parallel with each other and oriented toward the front of the case into which the clothes item is put in, or (ii) are disposed to face each other in the transverse direction.

17. The clothes folding machine of claim 16, wherein the conveyers are configured to rotate in a same direction when conveying the clothes item in the front-rear direction and configured to rotate in opposite directions when folding the clothes item along the primary transverse line and the secondary transverse line.

18. The clothes folding machine of claim 16, wherein the conveyers include:
a first conveyer disposed toward the front from the start point at the downstream side;
a second conveyer disposed ahead the first conveyer with the first gap therebetween; and a third conveyer disposed ahead the second conveyer with the second gap therebetween, and wherein the plurality of guide bars include:
- a first guide bar disposed over the first gap and configured to move up and down to form the primary transverse line, and
- a second guide bar disposed over the second gap and configured to move up and down to form the secondary transverse line.

19. The clothes folding machine of claim 18, wherein:
a front end portion of the first conveyer and a rear end portion of the second conveyer are inclined downward rearward and configured to fold the clothes item along the primary transverse line by putting the clothes item into the first gap, wherein the clothes item finished with folding along the primary transverse line is discharged onto the second conveyer from the first gap, and a front end portion of the second conveyer and a rear end portion of the third conveyer are inclined downward forward and configured to fold the clothes item along the secondary transverse line by putting the clothes item into the second gap, wherein the clothes item finished with folding along the secondary transverse line is discharged under the third conveyer from the second gap.

* * * * *